United States Patent
Uemura

(10) Patent No.: US 9,315,680 B2
(45) Date of Patent: Apr. 19, 2016

(54) CONDUCTIVE COMPOSITION FOR COATING A CURRENT COLLECTOR FOR A BATTERY OR AN ELECTRICAL DOUBLE LAYER CAPACITOR, CURRENT COLLECTOR FOR BATTERY OR ELECTRICAL DOUBLE LAYER CAPACITOR, BATTERY, AND ELECTRICAL DOUBLE LAYER CAPACITOR

(75) Inventor: Taichi Uemura, Chiba (JP)

(73) Assignee: KYORITSU CHEMICAL & CO., LTD., Tokyo (JP)

( * ) Notice: Subject to any disclaimer, the term of this patent is extended or adjusted under 35 U.S.C. 154(b) by 390 days.

(21) Appl. No.: 13/820,052

(22) PCT Filed: Aug. 25, 2011

(86) PCT No.: PCT/JP2011/069120
§ 371 (c)(1),
(2), (4) Date: Feb. 28, 2013

(87) PCT Pub. No.: WO2012/029618
PCT Pub. Date: Mar. 8, 2012

(65) Prior Publication Data
US 2013/0164614 A1 Jun. 27, 2013

(30) Foreign Application Priority Data

Aug. 31, 2010 (JP) .................... 2010-193498

(51) Int. Cl.
*H01M 4/62* (2006.01)
*C09D 5/24* (2006.01)
(Continued)

(52) U.S. Cl.
CPC *C09D 5/24* (2013.01); *H01B 1/122* (2013.01); *H01G 9/016* (2013.01); *H01G 11/04* (2013.01); *H01G 11/28* (2013.01); *H01G 11/32* (2013.01);
(Continued)

(58) Field of Classification Search
CPC ........................................................ H01M 4/62
See application file for complete search history.

(56) References Cited

U.S. PATENT DOCUMENTS

| 5,589,297 A | 12/1996 | Koga et al. |
| 2010/0035074 A1* | 2/2010 | Cohen et al. .................. 428/500 |

(Continued)

FOREIGN PATENT DOCUMENTS

| CN | 103155068 A | 6/2013 |
| JP | 63-121265 A | 5/1988 |

(Continued)

OTHER PUBLICATIONS

P 2010146726 MT.*

(Continued)

*Primary Examiner* — Patrick Ryan
*Assistant Examiner* — Alex Usyatinsky
(74) *Attorney, Agent, or Firm* — Osha · Liang LLP

(57) ABSTRACT

A conductive composition for coating a current collector of coating a current collector for a battery or an electrical double layer capacitor, where the adhesion properties between a battery current collector and an active material layer are increased to improve the battery characteristics is presented. A battery using the battery current collector using the composition is also presented. The conductive composition for coating the current collector includes a vinylsilane copolymer, a polycarboxylic acid, and a conductive auxiliary. The formulation of the vinylsilane copolymer is also presented.

19 Claims, 2 Drawing Sheets

(51) Int. Cl.
  *H01G 11/32* (2013.01)
  *H01G 11/04* (2013.01)
  *H01B 1/12* (2006.01)
  *H01G 9/008* (2006.01)
  *H01G 11/28* (2013.01)
  *H01G 11/68* (2013.01)
  *H01M 4/66* (2006.01)

(52) U.S. Cl.
  CPC .............. *H01G 11/68* (2013.01); *H01M 4/62* (2013.01); *H01M 4/622* (2013.01); *H01M 4/667* (2013.01); *H01M 4/668* (2013.01); *Y02E 60/13* (2013.01)

(56) References Cited

U.S. PATENT DOCUMENTS

| 2011/0091771 A1* | 4/2011 | Sannan et al. ................ 429/217 |
| 2011/0136007 A1* | 6/2011 | Zhamu .................... C01B 31/04 429/209 |

FOREIGN PATENT DOCUMENTS

| JP | 07-201362 A | 8/1995 |
| JP | 9-237625 A | 9/1997 |
| JP | 3789427 B2 | 4/2006 |
| JP | 2008-153053 A | 7/2008 |
| JP | 2010-146726 A | 7/2010 |
| WO | 2009147989 A1 | 12/2009 |

OTHER PUBLICATIONS

International Search Report issued in PCT/JP2011/069120 mailed Nov. 15, 2011 (4 pages).
Patent Abstracts of Japan for Japanese Publication No. 2008-153053, publication date Jul. 3, 2008 (1 page).
Patent Abstracts of Japan for Japanese Publication No. 63-121265, publication date May 25, 1988 (1 page).
Patent Abstracts of Japan for Japanese Publication No. 09-237625, publication date Sep. 9, 1997 (1 page).
Patent Abstracts of Japan for Japanese Publication No. 2010-146726, publication date Jul. 1, 2010 (1 page).
Written Opinion issued in PCT/JP2011/069120 mailed Nov. 15, 2011 (3 pages).
Office Action issued Dec. 3, 2014 in corresponding Chinese application No. 201180041871.2 (10 pages).

* cited by examiner

CONDUCTIVE COMPOSITION FOR COATING A CURRENT COLLECTOR FOR A BATTERY OR AN ELECTRICAL DOUBLE LAYER CAPACITOR, CURRENT COLLECTOR FOR BATTERY OR ELECTRICAL DOUBLE LAYER CAPACITOR, BATTERY, AND ELECTRICAL DOUBLE LAYER CAPACITOR

FIELD OF THE INVENTION

The present invention relates to a conductive composition for coating a current collector for a battery or an electrical double layer capacitor, a current collector for a battery or an electrical double layer capacitor coated with the conductive composition, and a battery and an electrical double layer capacitor comprising the current collector for a battery or an electrical double layer capacitor.

BACKGROUND

Various rechargeable batteries have been put into practical use as a power source for mobile electric devices, such as a cell phone and a laptop computer. Especially, a lithium-ion secondary battery which is lightweight and which has a high voltage and a large capacity, and an electrical double layer capacitor having excellent charge/discharge rate characteristics have been widely used.

A battery used as power supply for vehicle and others needs to discharge and charge a large current in a short time upon starting and stopping the car, but the conventional battery has a high internal resistance so that it cannot exhibit practically satisfactory high-rate charge/discharge cycle characteristics. In addition, the conventional battery is unsatisfactory in respect of the charge/discharge capacity from the viewpoint of the running distance, and further unsatisfactory in respect of the adhesion properties between the electrode active material layer and the metal current collector from the viewpoint of the safety.

One of the reasons why the battery cannot exhibit satisfactory properties as mentioned above resides in that the resistance between the metal current collector and the active material layer is so high, while the adhesion force between the metal current collector and the active material layer is not satisfactory.

As a method for solving the above problem, a method has been proposed in which a metal current collector is provided with a conductive coating layer, and an active material layer is formed on the surface of the conductive coating layer to reduce the resistance at the interface between the metal current collector and the active material layer, thus improving the adhesion force between the metal current collector and the active material layer (patent documents 1 and 2).

Especially, a method using, as a binder, polyvinyl alcohol modified with a silanol group, which is capable of being chemically bonded to a hydroxyl group on the surface of a metal current collector as shown in the following formula (A):

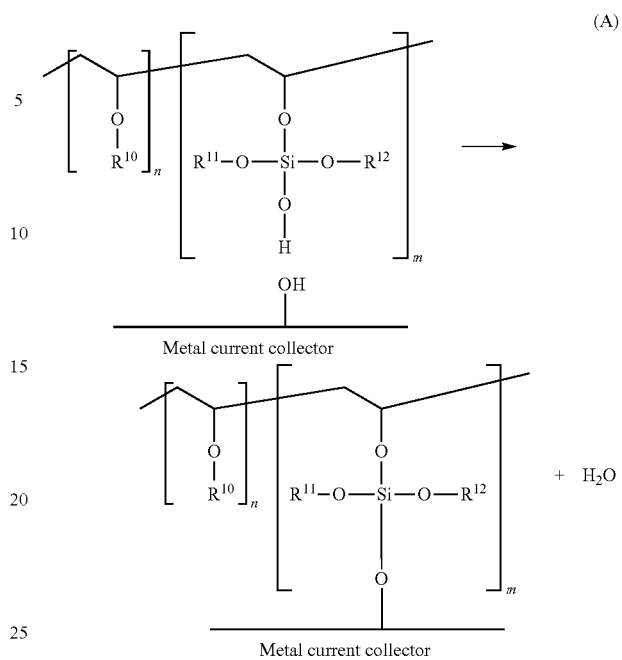

wherein $R^{10}$ is H or —$COCH_3$, and each of $R^{11}$ and $R^{12}$ is H or an ethyl group, has been proposed (patent documents 3 and 4).

Further, a method has been proposed in which the surface of a current collector is preliminarily treated using, e.g., a silane coupling agent and coated with a conductive composition for coating a current collector for a battery or an electrical double layer capacitor (patent document 5).

For solving the above problem, the present inventor has made a method using a conductive composition for coating a current collector for a battery or an electrical double layer capacitor wherein the conductive composition comprises polyvinyl alcohol, a silane coupling agent, a polycarboxylic acid which fauns a bond with a hydroxyl group of the surface of a metal current collector and of the polyvinyl alcohol, and with a silanol group of the silane coupling agent, and bonds them together through an ester linkage, and a conductive auxiliary (patent document 6).

REFERENCES

Patent Documents

Patent document 1: Japanese Unexamined Patent Publication No. Sho 63-121265
Patent document 2: Japanese Unexamined Patent Publication No. Hei 7-201362
Patent document 3: Japanese Patent No. 3789427
Patent document 4: WO2009/147989 pamphlet
Patent document 5: Japanese Unexamined Patent Publication No. 2008-153053
Patent document 6: Japanese Unexamined Patent Publication No. 2010-146726

Problems to be Solved by the Invention

However, by the methods of patent documents 3 and 4, the battery used as power supply for vehicle and others cannot achieve practically satisfactory high-rate charge/discharge cycle characteristics, and, particularly when the battery or electrical double layer capacitor obtained by the methods is subjected to long-term charge/discharge cycle test or high-temperature shelf test, the deterioration of the battery or electrical double layer capacitor characteristics cannot be satisfactorily prevented.

Further, when using the method of patent document 5, there is a problem in that the active material layer is formed through an insulating layer, though it is thin, so that the battery is increased in internal resistance, lowering the charge/discharge speed.

By the method of patent document 6 using a polycarboxylic acid, the adhesion force of the current collector to the active material layer can be improved to further improve the high-rate charge/discharge characteristics, as compared to that achieved by the conventional method using only polyvinyl alcohol or method using silanol group-modified polyvinyl alcohol. However, when the battery or electrical double layer capacitor obtained by this method is charged and discharged in many cycles for a long term or the charged battery or capacitor is allowed to stand at a high temperature, the deterioration of the battery or electrical double layer capacitor characteristics cannot be satisfactorily prevented.

An object of the present invention is to provide a conductive composition for coating a current collector for a battery or an electrical double layer capacitor, which composition is advantageous in that the adhesion properties (peel resistance) between a current collector for a battery or an electrical double layer capacitor and an active material layer are increased to improve the battery or electrical double layer capacitor characteristics (cycle life and float life), a current collector for a battery or an electrical double layer capacitor using the conductive composition for coating a current collector for a battery or an electrical double layer capacitor, and a battery and an electrical double layer capacitor using the current collector for a battery or an electrical double layer capacitor and having excellent battery or electrical double layer capacitor characteristics (cycle life and float life).

SUMMARY OF THE INVENTION

The present invention is directed to:

a conductive composition for coating a current collector for a battery or an electrical double layer capacitor, the conductive composition comprising a vinylsilane copolymer, a polycarboxylic acid (excluding the vinylsilane copolymer), and a conductive auxiliary, wherein the vinylsilane copolymer is represented by the following formula (1):

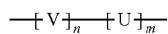
(1)

wherein U represents a unit represented by the following formula (2):

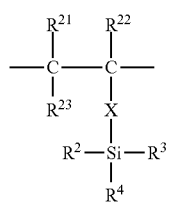
(2)

wherein X represents a single bond or a bonding chain (excluding oxygen), each of $R^2$ to $R^4$ independently represents a group selected from the group consisting of:
—$OR^5$ (wherein $R^5$ represents a group selected from the group consisting of H, a $C_1$-$C_6$ alkyl group, and a group derived from a cation capable of constituting an electrolyte for a battery or electrical double layer capacitor);
a $C_1$-$C_6$ alkyl group; and
a halogen group, and
each of $R^{21}$ to $R^{23}$ independently represents H or a $C_1$-$C_6$ alkyl group,
V represents a unit derived from a vinyl monomer having at least an active hydrogen group (excluding the U),
m represents a number of from 1 to 10,000, and
n represents a number of from 20 to 100,000,
wherein the ratio of m to n (m/n) is 0.0001 to 1;

(2) a conductive composition for coating a current collector for a battery or an electrical double layer capacitor, the conductive composition comprising a vinyl carboxylate copolymer, a polycarboxylic acid (excluding the vinyl carboxylate copolymer), and a conductive auxiliary, wherein the vinyl carboxylate copolymer is a copolymer of a vinyl carboxylate monomer and a vinylsilane monomer, wherein the vinylsilane monomer is at least one compound selected from the group consisting of a vinylalkyldialkoxysilane, a γ-(meth)acryloxypropyltrialkoxysilane, a γ-(meth)acryloxypropylalkyldialkoxysilane, and vinyltris(β-methoxyethoxy)silane;

(3) a current collector for a battery or an electrical double layer capacitor which is coated with the conductive composition for coating a current collector for a battery or an electrical double layer capacitor according to item (1) or (2) above; and (4) a battery or electrical double layer capacitor comprising the current collector for a battery or an electrical double layer capacitor according to item (3) above.

Effect of the Invention

In the present invention, there can be provided a conductive composition for coating a current collector for a battery or an electrical double layer capacitor, which composition is advantageous in that the adhesion properties (peel resistance) between a current collector for a battery or an electrical double layer capacitor and an active material layer are increased to improve the battery or electrical double layer capacitor characteristics (cycle life and float life), a current collector for a battery or an electrical double layer capacitor using the conductive composition for coating a current collector for a battery or an electrical double layer capacitor, and a battery and an electrical double layer capacitor using the current collector for a battery or an electrical double layer capacitor and having excellent battery or electrical double layer capacitor characteristics (cycle life and float life).

DETAILED DESCRIPTION

Figure 1:
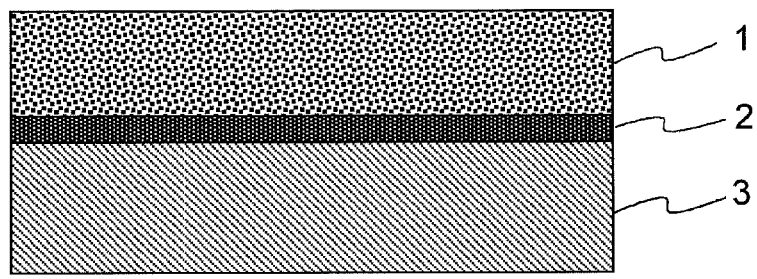
FIG. 1 is a cross-sectional view of a battery electrode comprising a current collector coated with the conductive composition for coating a current collector for a battery or an electrical double layer capacitor, and an active material layer.

More specifically, the problem to be solved by the present invention is that to provide the conductive coating composition for current collector, which exhibits a satisfactorily low resistance from a practical point of view, where the composition is used for, for example, increasing the adhesion properties between a current collector of a battery and an active material layer to improve the battery or electrical double layer capacitor characteristics. Further, the problems are that it is electrochemically decomposed and peeled off when the battery or electrical double layer capacitor is charged and discharged for a long term or the charged battery or capacitor is allowed to stand at a high temperature, causing the battery properties to become extremely poor.

The present inventor has made studies on the above-mentioned problems accompanying the prior art. As a result, the reason that the battery or electrical double layer capacitor characteristics deteriorate has been found to reside in that the conventional binder has a structure such that hydrogen in the hydroxyl group of polyvinyl alcohol is replaced by Si. Specifically, as shown in the following formula (B):

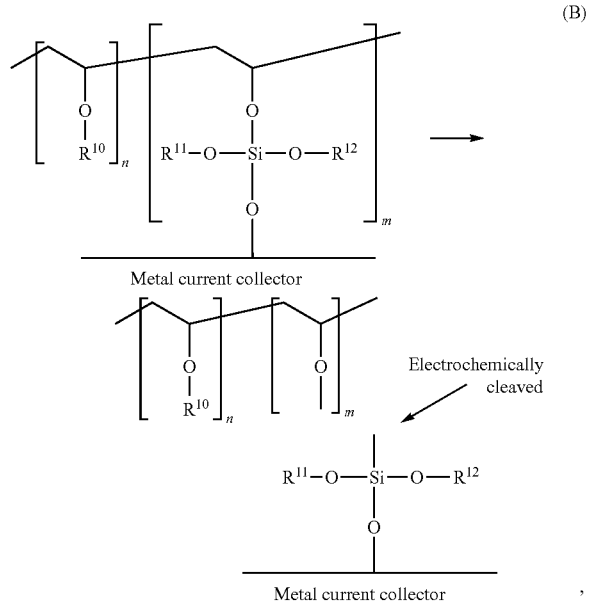

a structure (siloxane linkage) such that hydrogen in the hydroxyl group of polyvinyl alcohol is replaced by Si is easily electrochemically cleaved, and therefore the coating layer is easily peeled off during the charging and discharging, and it has been found that this causes the battery or electrical double layer capacitor characteristics to deteriorate.

The present invention has been achieved based on the finding that, by coating a current collector with a conductive composition for coating a current collector for a battery or an electrical double layer capacitor, which comprises a copolymer of a vinylsilane monomer and a vinyl monomer having active hydrogen (preferably a vinyl carboxylate copolymer having Si directly bonded to the skeletal carbon of the vinyl carboxylate copolymer), and a polycarboxylic acid, the deterioration of the battery or electrical double layer capacitor characteristics can be prevented when the battery or electrical double layer capacitor is charged and discharged in many cycles for a long term or the charged battery or capacitor is allowed to stand at a high temperature.

More specifically, the conductive composition of the present invention for coating a current collector for a battery or an electrical double layer capacitor has an advantage in that the composition is chemically bonded to, for example, a metal current collector by replacing a silicon element in the vinylsilane copolymer (preferably a vinyl carboxylate copolymer) by active hydrogen present on the surface of the metal current collector, and therefore exhibits high adhesion force to the metal current collector, and further a "—C—O—Si—" linkage structure which is easily electrochemically decomposed is not formed in the main chain, so that an electrochemically stable coating layer can be formed.

The conductive coating layer on a current collector for a battery or an electrical double layer capacitor using the conductive composition of the present invention for coating a current collector for a battery or an electrical double layer capacitor has further improved adhesion properties to the active material layer, and therefore chipping of the electric conduction properties is unlikely to occur when slitting the electrode, making it possible to prevent an accident caused due to short-circuiting during the use.

The battery or electrical double layer capacitor of the present invention is advantageous not only in that it has a low internal resistance and excellent charge/discharge cycle characteristics as well as a large charge/discharge capacity, but also in that, when the battery or electrical double layer capacitor is charged and discharged in many cycles for a long term, the removal of the electrode active material from the current collector of a battery or of an electrical double layer capacitor is unlikely to occur, achieving an increased life.

[Conductive Composition for Coating a Current Collector for a Battery or an Electrical Double Layer Capacitor]

The conductive composition for coating a current collector for a battery or an electrical double layer capacitor according to the first embodiment of the present invention is a conductive composition for coating a current collector for a battery or an electrical double layer capacitor, which comprises a vinylsilane copolymer, a polycarboxylic acid (excluding the vinylsilane copolymer), and a conductive auxiliary, wherein the vinylsilane copolymer is represented by the following formula (1):

 (1)

wherein U represents a unit represented by the following formula (2):

 (2)

wherein X represents a single bond or a bonding chain (excluding oxygen), each of $R^2$ to $R^4$ independently represents a group selected from the group consisting of:
—$OR^5$ (wherein $R^5$ represents a group selected from the group consisting of H, a $C_1$-$C_6$ alkyl group, and a group derived from a cation capable of constituting an electrolyte for a battery or electrical double layer capacitor);
a $C_1$-$C_6$ alkyl group; and
a halogen group, and
each of $R^{21}$ to $R^{23}$ independently represents H or a $C_1$-$C_6$ alkyl group, preferably H or a methyl group, more preferably H,
V represents a unit derived from a vinyl monomer having at least an active hydrogen group (excluding the U),
m represents a number of from 1 to 10,000, and
n represents a number of from 20 to 100,000,
wherein the ratio of m to n (m/n) is 0.0001 to 1.

The conductive composition for coating a current collector for a battery or an electrical double layer capacitor according to the second embodiment of the present invention is a conductive composition for coating a current collector for a battery or an electrical double layer capacitor, the conductive composition comprising a vinyl carboxylate copolymer, a polycarboxylic acid (excluding the vinyl carboxylate copolymer), and a conductive auxiliary,
wherein the vinyl carboxylate copolymer is a copolymer of a vinyl carboxylate monomer and a vinylsilane monomer,
wherein the vinylsilane monomer is at least one compound selected from the group consisting of a vinylalkyldialkoxysilane, a γ-(meth)acryloxypropyltrialkoxysilane, a γ-(meth)acryloxypropylalkyldialkoxysilane, and vinyltris(β-methoxyethoxy)silane.

A preferred mode of the vinylsilane copolymer in the conductive composition for coating a current collector for a battery or an electrical double layer capacitor according to the first embodiment of the present invention is the vinyl carboxylate copolymer in the conductive composition for coating a current collector for a battery or an electrical double layer capacitor according to the second embodiment of the present invention, and, in the conductive compositions for coating a current collector for a battery or an electrical double layer capacitor according to the first and second embodiments of the present invention, the definitions and preferred modes of the polycarboxylic acid and conductive auxiliary are common except the note in brackets with respect to the polycarboxylic acid.

Hereinbelow, the conductive composition for coating a current collector for a battery or an electrical double layer capacitor according to the first embodiment of the present invention is described, and the description of the first embodiment can be applied to the conductive composition for coating a current collector for a battery or an electrical double layer capacitor according to the second embodiment of the present invention, when the vinylsilane copolymer is replaced by a vinyl carboxylate copolymer, unless otherwise specified.

Hereinafter, the conductive composition for coating a current collector for a battery or an electrical double layer capacitor according to the first embodiment of the present invention is also referred to as "conductive composition for coating a current collector for a battery or an electrical double layer capacitor".

Further, the polycarboxylic acid in the present invention involves both a polycarboxylic acid and an acid anhydride derived from the polycarboxylic acid, and, hereinafter, they are collectively referred to as "polycarboxylic acid", or referred to as "polycarboxylic acid (including an acid anhydride derived from the polycarboxylic acid)".

(Vinylsilane Copolymer)

The vinylsilane copolymer in the present invention (hereinafter, also referred to as "vinylsilane copolymer") is represented by formula (1) above. Hereinafter, the unit represented by formula (2) is also referred to as "vinylsilane monomer-derived unit".

In the conductive composition for coating a current collector for a battery or an electrical double layer capacitor, comprising a vinylsilane copolymer, a polycarboxylic acid (excluding the vinylsilane copolymer), and a conductive auxiliary, the polycarboxylic acid serves as a crosslinking agent, and the vinylsilane copolymer serves as a binder, together with the polycarboxylic acid.

Specifically, when heat-curing the conductive composition for coating a current collector for a battery or an electrical double layer capacitor, an active hydrogen group of the unit derived from a vinyl monomer having at least an active hydrogen group (hereinafter, also referred to as "vinyl monomer") in the vinylsilane copolymer and the polycarboxylic acid cause a dehydration-condensation polymerization reaction (e.g., an ester linkage formation reaction), so that the vinylsilane copolymer undergoes crosslinking.

Further, when heat-curing the conductive composition for coating a current collector for a battery or an electrical double layer capacitor, which is in the form of being dissolved in a solvent, a crosslinking reaction can be initiated merely by causing the solvent to vaporize (the reason for which is presumed that the intermolecular distance between the vinylsilane copolymer and the polycarboxylic acid is reduced in the solvent), and further heating can promote the crosslinking reaction.

The temperature for the promotion of the crosslinking reaction by heating is preferably in the range of from 40 to 250° C., and, from the viewpoint of achieving a good balance between the crosslinking rate and the heat deterioration of an adherend, the temperature is more preferably in the range of from 100 to 180° C.

(Unit V (Vinyl Monomer-derived Unit))

With respect to the active hydrogen group of the vinyl monomer-derived unit, specifically, from the viewpoint of achieving excellent stability during the production and excellent electrolysis resistance properties, preferred examples include a hydroxyl group (—OH), a carboxyl group (—COOH), an amino group (—$NH_2$, —$NHR^6$), a hydrazide group)($R^7R^8NN(R^9)C(\!=\!O)R^{10}$, a hydroxyamino group (—NHOH), a sulfonic group (—$SO_3H$), and a thiol group (—SH), wherein, in the above formulae, each of $R^6$ to $R^{10}$ independently represents a hydrogen atom, a $C_1$-$C_8$ alkyl group, a hydroxyl group, an acyl group, a carboxyl group, an amino group, a vinyl group, an allyl group, an aryl group, a halogen, or a metal, and more preferred are a hydroxyl group, an amino group, and a sulfonic group.

The active hydrogen group of the vinyl monomer-derived unit in the vinylsilane copolymer and an active hydrogen group of another vinyl monomer-derived unit in the vinylsilane copolymer or an active hydrogen group of a vinyl monomer-derived unit in another vinylsilane copolymer can together form a dipole interaction or a hydrogen bond, and further the active hydrogen group of the vinyl monomer-derived unit in the vinylsilane copolymer and the polycarboxylic acid cause a dehydration-condensation polymerization reaction, making it possible to cause the copolymer to undergo crosslinking and cause the copolymer and an active hydrogen group on the surface of a current collector to undergo crosslinking.

From the viewpoint of achieving excellent stability during the production and excellent electrolysis resistance properties, the vinyl monomer from which the vinyl monomer-derived unit is derived is preferably a vinyl carboxylate monomer or an acryl monomer, more preferably a vinyl carboxylate monomer.

The vinylsilane copolymer in which the vinyl monomer is a vinyl carboxylate monomer is also referred to as vinyl carboxylate copolymer (the conductive composition for coating a current collector for a battery or an electrical double layer capacitor according to the second embodiment of the present invention).

Examples of vinyl carboxylate monomers include vinyl acetate, vinyl propionate, vinyl butyrate, vinyl caproate, vinyl caprylate, vinyl caprate, vinyl laurate, vinyl myristate, vinyl palmitate, vinyl stearate, vinyl cyclohexanecarboxylate, vinyl pivalate, vinyl octylate, vinyl monochloroacetate, vinyl adipate, vinyl methacrylate, vinyl crotonate, vinyl sorbate, vinyl benzoate, and vinyl cinnamate.

Unit V derived from a vinyl carboxylate monomer is preferably a vinyl carboxylate monomer-derived unit represented by the following formula (4):

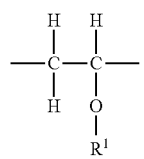

(4)

wherein $R^1$ represents a group selected from the group consisting of H, an organic group derived from a carboxylic acid, and a group derived from a cation capable of constituting an electrolyte for a battery or electrical double layer capacitor, and, as a source of supplying an ion species as irreversible capacity during the charging and discharging, preferred is a group derived from a cation constituting an electrolyte for the corresponding battery or electrical double layer capacitor, and, in a lithium-ion battery, Li is preferred, and, in a sodium-ion battery, Na is preferred.

The vinyl carboxylate monomer-derived unit wherein $R^1$ is H or an organic group derived from a carboxylic acid can be obtained by preferably saponifying a vinyl carboxylate copolymer obtained by vinyl polymerization of a vinyl carboxylate monomer.

In this case, namely, when $R^1$ is an organic group derived from a carboxylic acid, from the viewpoint of achieving excellent resistance to electrolytic solution and excellent adhesion properties to a current collector, and from the viewpoint of increasing the pressure welding effect of the conductive auxiliary to the current collector due to the cure shrinkage stress caused by the reaction with the polycarboxylic acid, the percentage of the organic group derived from a carboxylic acid is preferably 30% or less (i.e., the saponification degree is 70% or more), more preferably 20% or less (i.e., the saponification degree is 80% or more), further preferably 10% or less (i.e., the saponification degree is 90% or more), that is, preferably 0 to 30% (i.e., the saponification degree is 70 to 100%), more preferably 0 to 20% (i.e., the saponification degree is 80 to 100%), further preferably 0 to 10% (i.e., the saponification degree is 90 to 100%).

Organic group $R^1$ derived from a carboxylic acid can be a hydrocarbon group which can be substituted with a halogen, preferably a $C_1$-$C_{17}$ linear or branched alkyl group (e.g., a methyl group, an ethyl group, a propyl group, a pentyl group, a heptyl group, a nonyl group, an undecanyl group, a tridecanyl group, a pentadecanyl group, a heptadecanyl group, a monochloromethyl group, or a 1-ethylpentyl group), a $C_3$-$C_6$ cycloalkyl group (e.g., a cyclohexyl group or a cyclopentyl group), or an aromatic group (e.g., a phenyl group); or can be represented by —CO—$R^{41}$ wherein $R^{41}$ is a $C_1$-$C_{17}$ linear or branched alkyl group which can be substituted with a halogen (e.g., a methyl group, an ethyl group, a propyl group, a pentyl group, a heptyl group, a nonyl group, an undecanyl group, a tridecanyl group, a pentadecanyl group, a heptadecanyl group, a monochloromethyl group, or a 1-ethylpentyl group), a $C_3$-$C_6$ cycloalkyl group (e.g., a cyclohexyl group or a cyclopentyl group), or an aromatic group (e.g., a phenyl group).

When $R^1$ is a group derived from a cation capable of constituting an electrolyte for a battery or electrical double layer capacitor, the cation capable of constituting an electrolyte for a battery or electrical double layer capacitor can be an alkali metal excluding Li, such as Na or K, an alkaline earth metal, such as Be, Mg, Ca, or Sr, lithium, or a tetraalkylammonium, such as tetraethylammonium or triethylmethylammonium, from the viewpoint of the irreversible capacity, and is preferably a group derived from a cation constituting an electrolyte for the corresponding battery or electrical double layer capacitor.

The cation capable of constituting an electrolyte for a battery or electrical double layer capacitor may be a cation of an electrolyte which can be used as an electrolyte for a battery or electrical double layer capacitor, but is especially preferably a cation of an electrolyte for a battery or electrical double layer capacitor using the conductive composition of the present invention for coating a current collector for a battery or an electrical double layer capacitor. For example, in a lithium-ion secondary battery, the cation is lithium, and, in an electrical double layer capacitor, the cation is a tetraalkylammonium {in a capacitor using tetraethylammonium tetrafluoroborate, the cation is tetraethylammonium, and, in a capacitor using triethylmethylammonium bis(trifluoromethanesulfonyl)imide, the cation is triethylmethylammonium}.

(Unit U (Vinylsilane Monomer-derived Unit))

The vinylsilane monomer-derived unit is represented by formula (2) above.

In formula (2), each of $R^2$ to $R^4$ independently represents a unit represented by a group selected from the group consisting of —$OR^5$, a $C_1$-$C_6$ alkyl group, and a halogen group, wherein $R^5$ represents a group selected from the group consisting of H, a $C_1$-$C_6$ alkyl group, and a group derived from a cation capable of constituting an electrolyte for a battery or electrical double layer capacitor.

From the viewpoint of achieving excellent stability during the production and excellent electrolysis resistance properties, each of $R^2$ to $R^4$ is preferably —$OCH_3$ and/or —$CH_3$, more preferably —$OCH_3$.

From the viewpoint of the irreversible capacity, $R^5$ is preferably a group derived from a cation constituting an electrolyte for the corresponding battery or electrical double layer capacitor.

When $R^5$ is a group derived from a cation capable of constituting an electrolyte for a battery or electrical double layer capacitor, the cation capable of constituting an electrolyte for a battery or electrical double layer capacitor can be an alkali metal excluding Li, such as Na or K, an alkaline earth metal, such as Be, Mg, Ca, or Sr, lithium, or a tetraalkylammonium, such as tetraethylammonium or triethylmethylammonium, from the viewpoint of the irreversible capacity, and is preferably a group derived from a cation constituting an electrolyte for the corresponding battery or electrical double layer capacitor.

In $R^5$, the cation capable of constituting an electrolyte for a battery or electrical double layer capacitor may be a cation of an electrolyte which can be used as an electrolyte for a battery or electrical double layer capacitor, but is especially preferably a cation of an electrolyte for a battery or electrical double layer capacitor using the conductive composition of the present invention for coating a current collector for a battery or an electrical double layer capacitor. For example, in a lithium-ion secondary battery, the cation is lithium, and, in an electrical double layer capacitor, the cation is a tetraalkylammonium, in a capacitor using tetraethylammonium tetrafluoroborate, the cation is tetraethylammonium, and, in a capacitor using triethylmethylammonium bis(trifluoromethanesulfonyl)imide, the cation is triethylmethylammonium.

When the case where all of $R^5$'s are replaced by the group derived from a cation capable of constituting an electrolyte for a battery or electrical double layer capacitor is taken as a replacement ratio of 100%, from the viewpoint of the battery capacity and life, the replacement ratio of the group derived from a cation capable of constituting an electrolyte for a battery or electrical double layer capacitor is preferably 5% or more, more preferably 20% or more.

The conductive composition for coating a current collector for a battery or an electrical double layer capacitor uses, as a binder, a vinylsilane copolymer (preferably a vinyl carboxylate copolymer) having a silanol group capable of being chemically bonded to a hydroxyl group present on the surface of a metal, and hence exhibits high adhesion force, and further a silicon atom is directly bonded to the principal chain carbon of the vinyl carboxylate copolymer, and therefore the composition is unlikely to electrochemically decompose.

Further, in the conductive composition for coating a current collector for a battery or an electrical double layer capacitor, when hydrogen in the silanol group is replaced by Na or a cation capable of constituting an electrolyte for the battery or electrical double layer capacitor used, a disadvantage in that the silanols undergo a condensation in the composition being stored to increase the viscosity of the composition or reduce the adhesion force can be prevented. Sodium hydroxide is used for saponifying the vinyl acetate moiety, and therefore $R^1$ and/or $R^5$ is substituted with Na (patent document 6), but, for example, when the conductive composition for coating a current collector for a battery or an electrical double layer capacitor, in which $R^1$ and/or $R^5$ is substituted with a Na ion, is applied to a lithium-ion secondary battery, the ionic conduction during the charging and discharging of the battery may be inhibited, the deterioration of the battery or electrical double layer capacitor characteristics may be caused, or the charge/discharge capacity may be reduced. Therefore, more preferred is a battery in which the above group is substituted with a cation of the electrolyte for the battery, and, with respect to the lithium-ion secondary battery, it is more preferred that the saponification is made using lithium hydroxide and $R^1$ and/or $R^5$ is substituted with Li.

The conductive composition for coating a current collector for a battery or an electrical double layer capacitor having a structure in which the active hydrogen groups of $R^1$ and $R^2$ to $R^4$ are replaced by lithium is preferred as a conductive composition for coating a lithium-ion secondary battery or electrical double layer capacitor current collector. In this conductive composition for coating a lithium-ion secondary battery or electrical double layer capacitor current collector, hydrogen in the silanol group and at least part of the hydroxyl group are replaced by lithium, which serves as an ion source when lithium ions are used up due to the deterioration caused by condensation of the silanols or the parasitic capacity upon charging and discharging a lithium-ion secondary battery having the composition incorporated, making it possible to improve the charge/discharge capacity.

When $R^5$ is a $C_1$-$C_6$ alkyl group, from the viewpoint of achieving excellent stability during the production and excellent electrolysis resistance properties, $R^5$ is preferably a $C_1$-$C_6$ linear or branched alkyl group, and examples include a methyl group, an ethyl group, n-propyl, and n-butyl, and more preferred is an ethyl group.

In formula (2), from the viewpoint of achieving excellent stability during the production and excellent electrolysis resistance properties, m is 1 to 10,000, preferably 5 to 1,000, more preferably 10 to 500.

In formula (2), from the viewpoint of achieving excellent stability during the production and excellent electrolysis resistance properties, n is 20 to 100,000, preferably 200 to 20,000, more preferably 300 to 1,000.

In formula (2), from the viewpoint of achieving excellent stability during the production and excellent electrolysis resistance properties, the ratio of m to n (m/n) is 0.0001 to 1, preferably 0.005 to 0.5, more preferably 0.01 to 0.1.

In formula (2), X is a single bond or a bonding chain (excluding oxygen).

In the present invention, the bonding chain means a group for bonding together the principal chain and silane structure of the vinylsilane copolymer, and examples include a group selected from the group consisting of hydrocarbons having 1 to 18 carbon atoms, such as alkylene, alkenylene, alkynylene, phenylene, and naphthylene (wherein these hydrocarbons may be substituted with a halogen, such as fluorine, chlorine, or bromine), —$(CH_2O)_m$—, —$(CH_2O)_mCH_2$—, —CO—, —COCO—, —$CO(CH_2)_mCO$—, —$CO(C_6H_4)CO$—, —S—, —CS—, —SO—, —$SO_2$—, —NR—, —CONR—, —NRCO—, —CSNR—, —NRCS—, —NRNR—, —$HPO_4$—, —$Si(OR)_2$—, —$Ti(OR)_2$—, and —$Al(OR)$—, wherein R each occurrence independently represents an arbitrary substituent, preferably a hydrogen atom or an alkyl group (particularly, an alkyl group having 1 to 4 carbon atoms), and m is a natural number, preferably 1 to 10.

From the viewpoint of achieving electrochemical stability of the siloxane linkage in formula (2) to surely obtain a peel resistance of the coating layer during the charging and discharging of the battery or electrical double layer capacitor, X is most preferably a single bond from a thermal stability point of view and from the viewpoint of structural stability under high temperature conditions/acidic conditions, but may be a bonding chain in such an amount that the effects of the present invention are not sacrificed. With respect to the bonding chain, there is no particular limitation, but examples of bonding chains include hydrocarbons having 1 to 18 carbon atoms, such as alkylene, alkenylene, alkynylene, phenylene, and naphthylene (wherein these hydrocarbons may be substituted with a halogen, such as fluorine, chlorine, or bromine), —$(CH_2O)_n$—, —$(CH_2O)_mCH_2$—, —CO—, —COCO—, —$CO(CH_2)_mCO$—, —$CO(C_6H_4)CO$—, —S—, —CS—, —SO—, —$SO_2$—, —NR—, —CONR—, —NRCO—, —CSNR—, —NRCS—, —NRNR—, —$HPO_4$—, —$Si(OR)_2$—, —$Ti(OR)_2$—, and —$Al(OR)$—, wherein R each occurrence independently represents an arbitrary substituent, preferably a hydrogen atom or an alkyl group (particularly, an alkyl group having 1 to 4 carbon atoms), and m is a natural number, preferably 1 to 10. Of these, from the viewpoint of achieving excellent stability during the production or use, the bonding chain is preferably an alkylene group having 6 carbon atoms or less, particularly a methylene group or —CH$_2$OCH$_2$—.

(Vinyl Carboxylate Copolymer)

The vinylsilane copolymer is preferably a vinyl carboxylate copolymer in which the vinyl monomer is a vinyl carboxylate monomer from the viewpoint of achieving excellent stability during the production and excellent electrolysis resistance properties.

It is preferred that the vinyl carboxylate copolymer is a copolymer in which unit V is represented by formula (4) above, and unit U is such that all of $R^{21}$ to $R^{23}$ are H, X is a single bond, and all of $R^2$ to $R^4$ are —OR$^5$ (each represented by OR$^{31}$ to R$^{33}$), that is, unit U is represented by the following formula (5):

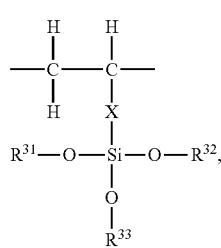

(5)

namely, a copolymer represented by the following formula (6):

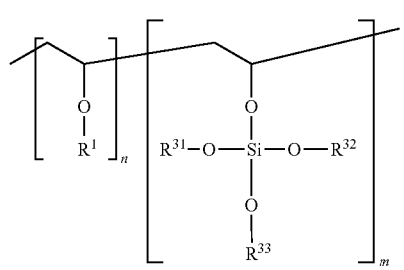

(6)

In formulae (5) and (6), each of $R^{31}$ to $R^{33}$ independently represents preferred modes of $R^5$ mentioned above.

As an example of the vinyl carboxylate copolymer, there can be mentioned a copolymer obtained by reacting vinyl acetate with vinyltriethoxysilane, where unit V has a —O—C(=O)CH$_3$ group (that is, R is a group:CH$_3$CO—), and each of $R^2$ to $R^4$ has a —OC$_2$H$_5$ group (that is, each of $R^{31}$ to $R^{33}$ is an ethyl group). The vinyl acetate moiety of this copolymer can be saponified by, e.g., sodium hydroxide to form a hydroxyl group, that is a copolymer where unit V has an —OH group or —ONa group (that is, $R^1$ is H or Na), and each of $R^2$ to $R^4$ has an —OH group or —ONa group (that is, each of $R^{31}$ to $R^{33}$ is H or Na). From the viewpoint of achieving excellent resistance to electrolytic solution, the saponification degree is preferably 50% or more (i.e., 50 to 100%), more preferably 70% or more (i.e., 70 to 100%), further preferably 80% or more (i.e., 80 to 100%), further preferably 90% or more (i.e., 90 to 100%). It is preferred that the active hydrogen of the hydrolyzed vinyl carboxylate copolymer is replaced by a group derived from a cation capable of constituting an electrolyte for a battery or electrical double layer capacitor, such as Na (specifically, a group derived from a cation capable of constituting an electrolyte for a battery or electrical double layer capacitor, such as Na, is introduced into $R^1$ and $R^2$ to $R^4$).

When the case where all of $R^1$ and $R^{31}$ to $R^{33}$ in formula (6) are replaced by the group derived from a cation capable of constituting an electrolyte for a battery or electrical double layer capacitor is taken as a replacement ratio of 100%, from the viewpoint of the battery capacity and life, the replacement ratio of the group derived from a cation capable of constituting an electrolyte for a battery or electrical double layer capacitor is preferably 5% or more, especially preferably 20% or more.

In the above reaction, as examples of substitutes for vinyl acetate, there can be mentioned vinyl propionate, vinyl butyrate, vinyl caproate, vinyl caprylate, vinyl caprate, vinyl laurate, vinyl myristate, vinyl palmitate, vinyl stearate, vinyl cyclohexanecarboxylate, vinyl pivalate, vinyl octylate, vinyl monochloroacetate, vinyl adipate, vinyl methacrylate, vinyl crotonate, vinyl sorbate, vinyl benzoate, and vinyl cinnamate, but, from the viewpoint of the cost and easy availability, vinyl acetate is preferably used. As a substitute for vinyltriethoxysilane, for example, vinyltrimethoxysilane, vinyltripropoxysilane, vinyltributoxysilane; a vinylalkyldialkoxysilane, such as vinylmethyldimethoxysilane, vinylmethyldiethoxysilane; a γ-(meth)acryloxypropyltrialkoxysilane, such as γ-(meth)acryloxypropyltrimethoxysilane or γ-(meth)acryloxypropyltriethoxysilane; a γ-(meth)acryloxypropylalkyldialkoxysilane, such as γ-(meth)acryloxypropylmethyldimethoxysilane or γ-(meth)acryloxypropylmethyldiethoxysilane; or vinyltris(β-methoxyethoxy)silane is preferably used, but, from the viewpoint of achieving excellent stability during the production and excellent electrolysis resistance properties, vinyltriethoxysilane is more preferred.

(Other Monomers which can be Introduced into the Vinylsilane Copolymer)

With respect to the vinylsilane copolymer, one obtained by copolymerizing a specific functional group-containing monomer with the vinyl monomer having an active hydrogen group (preferably a vinyl carboxylate monomer) and the vinylsilane monomer is preferred from the viewpoint of obtaining excellent adhesion properties to a current collector and excellent electrochemical stability.

Examples of specific functional group-containing monomers include glycidyl (meth)acrylate, glycidyl (meth)allyl ether, 3,4-epoxycyclohexyl (meth)acrylate; monomers having 2 or more allyl groups, such as triallyloxyethylene, diallyl maleate, triallyl cyanurate, triallyl isocyanurate, and tetraallyloxyethane; allyl glycidyl ether, allyl acetate, vinyl acetoacetate, allyl acetoacetate, allyl diacetoacetate, acetoacetoxyalkyl (meth)acrylates, such as acetoacetoxyethyl (meth)acrylate and acetoacetoxypropyl (meth)acrylate; acetoacetoxyalkyl crotonates, such as acetoacetoxyethyl crotonate and acetoacetoxypropyl crotonate; 2-cyanoacetoacetoxyethyl (meth)acrylate, divinylbenzene, diallyl phthalate, triallyl cyanurate, triallyl isocyanurate; alkylene glycol (meth)acrylates, such as ethylene glycol di(meth)acrylate, 1,2-propylene glycol di(meth)acrylate, 1,3-propylene glycol di(meth)acrylate, 1,4-butanediol di(meth)acrylate, 1,6-hexanediol di(meth)acrylate, and neopentyl glycol di(meth)acrylate; and hydroxyalkyl (meth)acrylates having an alkyl group having 1 to 10 carbon atoms, particularly 1 to 6 carbon atoms, such as trimethylolpropane tri(meth)acrylate, allyl (meth)acrylate, 2-hydroxyethyl (meth)acrylate, hydroxypropyl (meth)acrylate, and 4-hydroxybutyl (meth)acrylate.

These specific functional group-containing monomers can be used individually or in combination.

Further, as a functional group-containing monomer other than the above-mentioned specific functional group-containing monomer, a nitrile monomer, such as (meth)acrylonitrile, can be used.

From the viewpoint of surely achieving excellent polymerization stability, the amount of the total of the specific functional group-containing monomer and functional group-containing monomer other than the specific functional group-containing monomer is preferably 0.01 to 10% by weight, more preferably 0.05 to 5% by weight, especially preferably 0.1 to 5% by weight, further preferably 0.1 to 1% by weight, based on the total weight of the copolymerizable monomers.

In the vinylsilane copolymer, a copolymerizable monomer other than the specific functional group-containing monomer can be used in such an amount that the object aimed at by the present invention is not sacrificed, and examples of such monomers include styrene monomers, such as styrene and α-methylstyrene; vinyl monomers, e.g., vinyl carboxylates, such as vinyl acetate, vinyl propionate, vinyl laurate, and vinyl versatate, and alkyl vinyl ethers, such as methyl vinyl ether; olefin monomers, e.g., olefins, such as ethylene, propylene, 1-butene, and isobutene, olefin halides, such as vinyl chloride, vinylidene chloride, vinyl fluoride, and vinylidene fluoride, and ethylenesulfonic acid; and diene monomers, such as 1,3-butadiene, 2-methylbutadiene, 1,3- or 2,3-dimethyl-1,3-butadiene, and 2-chloro-1,3-butadiene.

Further, as a functional group-containing monomer other than the above-mentioned specific functional group-containing monomer, a nitrile monomer, such as (meth)acrylonitrile, can be used.

(Polycarboxylic Acid)

The polycarboxylic acid in the present invention is a polycarboxylic acid (including an acid anhydride derived from the polycarboxylic acid) having 2 or more carboxylic acids per molecule, preferably 2 to 1,000 carboxylic acids from the viewpoint of the reactivity and crosslink density, more preferably 3 to 100 carboxylic acids, and having a molecular weight of 100,000 or less, preferably a molecular weight of 30,000 or less, more preferably a molecular weight of 20,000 or less.

An aromatic carboxylic acid is preferred from the viewpoint of the reactivity, and one having 3 or more carboxylic acids per molecule is preferred from the viewpoint of the reactivity and crosslink density.

As an example of the polycarboxylic acid, there can be mentioned at least one compound selected from the group consisting of citric acid, butanetetracarboxylic acid, 3,3',4,4'-biphenyltetracarboxylic acid, hexahydrophthalic acid, 3,3',4,4'-diphenyl sulfone tetracarboxylic acid, methylbicyclo[2.2.1]heptane-2,3-dicarboxylic acid, bicyclo[2.2.1]heptane-2,3-dicarboxylic acid, aspartic acid, pyromellitic acid, mellitic acid, a phosphate group-containing tetracarboxylic acid, phenylethynylphthalic acid, and oxydiphthalic acid, and/or an acid anhydride derived from the above compound, and/or at least one compound selected from the group consisting of ethylene glycol bisanhydrotrimellitate (acid anhydride), 1,3,3a,4,5,9b-hexahydro-5(tetrahydro-2,5-dioxo-3-furanyl)naphtho[1,2-c]furan-1,3-dione (acid anhydride), glycerol bisanhydrotrimellitate monoacetate (acid anhydride), and ethylene glycol bisanhydrotrimellitate (acid anhydride).

(Conductive Auxiliary)

The conductive auxiliary in the present invention can be particles or filler having electric conduction properties, or a liquid having ionic properties.

Examples of particles or fillers having electric conduction properties include powders, flakes, and colloids of a metal, such as Ag, Cu, Au, Al, Mg, Rh, W, Mo, Co, Ni, Pt, Pd, Cr, Ta, Pb, V, Zr, Ti, In, Fe, or Zn; powders and flakes of an alloy, such as Sn—Pb, Sn—In, Sn—Bi, Sn—Ag, or Sn—Zn; carbon black, such as acetylene black, furnace black, and channel black, and conducting carbon materials, such as graphite, graphite fibers, graphite fibrils, carbon fibers, activated carbon, charcoal, carbon nanotubes, and fullerene; and metal oxide conducting fillers which exhibit electric conduction properties due to excess electrons formed by the presence of lattice defects, such as zinc oxide, tin oxide, indium oxide, and titanium oxides (titanium dioxide and titanium monoxide). These particles or fillers having electric conduction properties can be used individually or in combination, and further those having the surfaces treated with, e.g., a coupling agent are preferably used.

The size of the particles constituting the particles having electric conduction properties or filler having electric conduction properties is preferably in the range of from 0.001 to 100 μm from the viewpoint of the electric conduction properties and liquid properties, further preferably in the range of from 0.01 to 10 μm.

The size of the particles is an average particle diameter determined by taking a plane image of particles by an electron microscope and obtaining an average of the diameters of circles each having an area in the image with respect to the all particles measured.

The liquid having ionic properties can be a liquid having ions dissolved therein or an ionic liquid.

With respect to the liquid having ions dissolved therein, when the solvent is water, examples of ions include sodium chloride, potassium chloride, and lithium chloride, and, when the solvent is an organic material, such as dimethyl carbonate, examples of ions include lithium hexafluorophosphate.

Examples of ionic liquids include imidazolium salt derivatives, such as 1,3-dimethylimidazolium methyl sulfate, 1-ethyl-3-methylimidazolium bis(pentafluoroethylsulfonyl)imide, and 1-ethyl-3-methylimidazolium bromide; pyridinium salt derivatives, such as 3-methyl-1-propylpyridinium bis(trifluoromethylsulfonyl)imide and 1-butyl-3-methylpyridinium bis(trifluoromethylsulfonyl)imide; alkylammonium derivatives, such as tetrabutylammonium heptadecafluorooctanesulfonate and tetraphenylammonium methanesulfonate; and phosphonium salt derivatives, such as tetrabutylphosphonium methanesulfonate. These liquids having ionic properties can be used in combination with conducting particles.

(Contents of the Vinylsilane Copolymer, Polycarboxylic Acid, and Conductive Auxiliary)

As mentioned above, the conductive composition for coating a current collector for a battery or an electrical double layer capacitor comprises:

a vinylsilane copolymer (hereinafter, also referred to as "component A"), a polycarboxylic acid (excluding the vinylsilane copolymer)(hereinafter, also referred to as "component B"), and a conductive auxiliary {hereinafter, also referred to as "component C (when component C is a liquid having ions dissolved therein, the liquid other than ions is excluded)"}.

From the viewpoint of causing components A and B to stably function as a binder for improving the conductive composition for coating a current collector for a battery or an electrical double layer capacitor in the adhesion properties (peel resistance) between a battery current collector and an active material layer, relative to 100 parts by weight of component A (preferably a vinyl carboxylate copolymer), the amount of component B contained in the composition is preferably 1 to 300 parts by weight, more preferably 5 to 200 parts by weight, further preferably 10 to 200 parts by weight, still further preferably 10 to 100 parts by weight, further preferably 20 to 100 parts by weight.

From the viewpoint of preventing the excessive increase of the resistance due to the contact of the conductive auxiliary with each other or contact of the conductive auxiliary with the current collector and active material layer to stabilize the resistance, obtaining a good balance between the amounts of the conductive auxiliary and the binder, achieving stable adhesion force and stable electrolysis resistance properties, and further preventing the excessive reduction of the cure stress of resin to surely obtain the below-mentioned effect of penetration to the oxide film or hydroxide film on the surface of a current collector, relative to 100 parts by weight of component A (preferably a vinyl carboxylate copolymer), the amount of component C contained in the composition is preferably 10 to 9,900 parts by weight, more preferably 20 to 4,900 parts by weight, further preferably 50 to 1,900 parts by weight.

For causing the conductive composition for coating a current collector for a battery or an electrical double layer capacitor to stably exhibit the effect from a commercial point of view, the total of components A, B, and C is preferably 50 to 100% by weight, more preferably 80 to 100% by weight, further preferably 90 to 100% by weight, based on the weight of the nonvolatile component of the conductive composition for coating a current collector for a battery or an electrical double layer capacitor.

(Appearance of the Conductive Composition for Coating a Current Collector for a Battery or an Electrical Double Layer Capacitor)

The conductive composition for coating a current collector for a battery or an electrical double layer capacitor may be either in a state of solid, such as a powdery form or a flake form, or in a state of liquid, such as a paste, a solution, or a suspension, as long as the composition comprises components A, B, and C.

When the conductive composition for coating a current collector for a battery or an electrical double layer capacitor is applied as a coating film onto a battery current collector, the composition is preferably used in a liquid form, such as a paste, a solution, or a suspension. Therefore, when the conductive composition for coating a current collector for a battery or an electrical double layer capacitor is in a solid state, it is preferred that, before use, the composition is mixed with a solvent so that the composition becomes in a liquid state, and the resultant conductive composition for coating a current collector for a battery or an electrical double layer capacitor is used in the form of a paste, or is further mixed with a solvent so that the composition becomes in the state of a liquid having a viscosity or property suitable for the use.

In the conductive composition for coating a current collector for a battery or an electrical double layer capacitor, according to the coating apparatus, the below-mentioned solvent can be added in an arbitrary ratio for adjusting the viscosity of the composition, and, from the viewpoint of obtaining excellent coating properties, the composition preferably has a viscosity of 1 to 10,000 mPa·s, more preferably a viscosity of 10 to 1,000 mPa·s, especially preferably a viscosity of 100 to 500 mPa·s.

(Method for Producing the Conductive Composition for Coating a Current Collector for a Battery or an Electrical Double Layer Capacitor)

The conductive composition for coating a current collector for a battery or an electrical double layer capacitor can be obtained in the form of, e.g., a paste, a solution, or a suspension by mixing together components A, B, and C, and, if necessary, the below-mentioned arbitrary components and stirring the mixture. The stirring can be made by appropriately selecting a stirring apparatus, such as a propeller mixer, a planetary mixer, a hybrid mixer, a kneader, an emulsifying homogenizer, or an ultrasonic homogenizer. Further, the stirring can be made while heating or cooling if necessary so that the viscosity preferably falls in the above-mentioned preferred range.

[Arbitrary Component(s) of the Conductive Composition for Coating a Current Collector for a Battery or an Electrical Double Layer Capacitor]

(Solvent)

The conductive composition for coating a current collector for a battery or an electrical double layer capacitor can contain various types of solvents for adjusting the liquid properties, mainly the viscosity. Examples of solvents include hydrocarbons (such as propane, n-butane, n-pentane, isohexane, cyclohexane, n-octane, isooctane, benzene, toluene, xylene, ethylbenzene, amylbenzene, turpentine oil, and pinene), halogenated hydrocarbons (such as methyl chloride, chloroform, carbon tetrachloride, ethylene chloride, methyl bromide, ethyl bromide, chlorobenzene, chlorobromomethane, bromobenzene, fluorodichloromethane, dichlorodifluoromethane, and difluorochloroethane), alcohols (such as methanol, ethanol, n-propanol, isopropanol, n-amyl alcohol, isoamyl alcohol, n-hexanol, n-heptanol, 2-octanol, n-dodecanol, nonanol, cyclohexanol, and glycidol), ethers and acetals (such as ethyl ether, dichloroethyl ether, isopropyl ether, n-butyl ether, diisoamyl ether, methyl phenyl ether, ethyl benzyl ether, furan, furfural, 2-methylfuran, cineol, and methylal), ketones (such as acetone, methyl ethyl ketone, methyl n-propyl ketone, methyl n-amyl ketone, diisobutyl ketone, phorone, isophorone, cyclohexanone, and acetophenone), esters (such as methyl formate, ethyl formate, propyl formate, methyl acetate, ethyl acetate, propyl acetate, n-amyl acetate, methylcyclohexyl acetate, methyl butyrate, ethyl butyrate, propyl butyrate, and butyl stearate), polyhydric alcohols and derivatives thereof (such as ethylene glycol, ethylene glycol monomethyl ether, ethylene glycol monomethyl ether acetate, ethylene glycol monoethyl ether, methoxymethoxyethanol, ethylene glycol monoacetate, diethylene glycol, diethylene glycol monomethyl ether, propylene glycol, and propylene glycol monoethyl ether), fatty acids and phenols (such as formic acid, acetic acid, acetic anhydride, propionic acid, propionic anhydride, butyric acid, isovaleric acid, phenol, cresol, o-cresol, and xylenol), nitrogen compounds (such as nitromethane, nitroethane, 1-nitropropane, nitrobenzene, monomethylamine, dimethylamine, trimethylamine, monoethylamine, diamylamine, aniline, monomethylaniline, o-toluidine, o-chloroaniline, cyclohexylamine, dicyclohexylamine, monoethanolamine, formamide, N,N-dimethylformamide, acetamide, acetonitrile, pyridine, α-picoline, 2,4-lutidine, quinoline, and morpholine), sulfur, phosphorus and other compounds (such as carbon disulfide, dimethyl sulfoxide, 4,4-diethyl-1,2-dithiolane, dimethyl sulfide, dimethyl disulfide, methanethiol, propane sultone, triethyl phosphate, triphenyl phosphate, diethyl carbonate, ethylene carbonate, and amyl borate), inorganic solvents (such as liquid ammonia and silicone oil), and liquids, such as water.

(Other Binders)

As a binder other than the above-mentioned vinyl copolymer, the curing organic components and inorganic components described in Japanese Unexamined Patent Publication No. 2010-146726 can be appropriately selected and used.

Among these, with respect to the organic components, various types of epoxy compounds and siloxane compounds, curable monomers, and prepolymers, such as oligomers, can be used, and these can be used in the form of a polymer melted or dissolved in a solvent, or a fine powder having fluidity. Examples of the above thermoplastic resins include prepolymers and polymers comprising vinyl acetate, vinyl alcohol, vinyl butyral, vinyl chloride, a methacrylate, acrylic acid, methacrylic acid, styrene, ethylene, an amide, a cellulose, isobutylene, vinyl ether, polyvinylidene fluoride, or a polyester. Further, examples of the above thermosetting resins include prepolymers, polymers, and derivatives comprising urea, melamine, phenol, resorcinol, epoxy, oxetane, episulfide, isocyanate, a mixture of chitosan and a carboxylic acid, or an imide. These compounds can be used individually or in combination.

(Coupling Agent)

The conductive composition for coating a current collector for a battery or an electrical double layer capacitor can further contain a coupling agent.

With respect to the coupling agent, specific examples include fluorine silane coupling agents, such as (tridecafluoro-1,1,2,2-tetrahydrooctyl)triethoxysilane; epoxy-modified silane coupling agents, such as a coupling agent manufactured by Shin-Etsu Chemical Co., Ltd. (trade name: KBM-403); oxetane-modified silane coupling agents, such as a coupling agent manufactured by Toagosei Co., Ltd. (trade name: TESOX conductive composition for coating battery current collector); silane coupling agents, such as vinyltrimethoxysilane, vinyltriethoxysilane, γ-chloropropyltrimethoxysilane, 3-isocyanatopropyltriethoxysilane, 3-(trimethoxysilyl)propylsuccinic anhydride, γ-aminopropyltriethoxysilane, N-(β-aminoethyl)-γ-aminopropyltrimethoxysilane, N-(β-aminoethyl)-γ-aminopropylmethyldimethoxysilane, γ-glycidoxypropyltrimethoxysilane, β-glycidoxypropylmethyldimethoxysilane, γ-methacryloxypropyltrimethoxysilane, γ-methacryloxypropylmethyldimethoxysilane, and γ-mercaptopropyltrimethoxysilane; and titanium coupling agents, such as triethanolamine titanate, titanium acetylacetonate, titanium ethylacetoacetate, titanium lactate, titanium lactate ammonium salt, tetrastearyl titanate, isopropyltricumylphenyl titanate, isopropyltri(N-aminoethyl-aminoethyl) titanate, dicumylphenyl oxyacetate titanate, isopropyltrioctanoyl titanate, isopropyldimethacrylisostearoyl titanate, titanium lactate ethyl ester, octylene glycol titanate, isopropyltriisostearoyl titanate, triisostearylisopropyl titanate, isopropyltridodecylbenzenesulfonyl titanate, tetra(2-ethylhexyl) titanate, butyl titanate dimer, isopropylisostearoyldiacryl titanate, isopropyltri(dioctyl phosphate) titanate, isopropyltris(dioctyl pyrophosphate) titanate, tetraisopropylbis(dioctyl phosphite) titanate, tetraoctylbis(ditridecyl phosphite) titanate, tetra(2,2-diallyloxymethyl-1-butyl)bis(di-tridecyl) phosphite titanate, bis(dioctyl pyrophosphate) oxyacetate titanate, bis(dioctyl pyrophosphate) ethylene titanate, tetra-1-propyl titanate, tetra-n-butyl titanate, and diisostearoyl ethylene titanate.

These compounds can be used individually or in combination.

As a coupling agent, a titanium coupling agent or a silane coupling agent is preferred.

By incorporating a coupling agent into the conductive composition for coating a current collector for a battery or an electrical double layer capacitor, the coupling agent can be reacted with the substituent having active hydrogen (e.g., a hydrogen bonding functional group) contained in the conductive composition for coating a current collector for a battery or an electrical double layer capacitor to further improve the crosslink density, making it possible to further suppress a mutual replacement reaction between elements constituting the conductive composition for coating a current collector for a battery or an electrical double layer capacitor and elements constituting the current collector.

Particularly, a crosslinking reaction caused due to a titanium coupling agent or a silane coupling agent makes it possible to improve the crosslinking rate or improve the adhesion force, strength, or electrochemical resistance.

Further, by incorporating a coupling agent into the conductive composition for coating a current collector for a battery or an electrical double layer capacitor, the formation of an excessively insulating modified layer at the interface can be prevented, making it possible to suppress the increase of the interface resistance.

Further, as described in Example 7 of Japanese Unexamined Patent Publication No. 2010-146726, the conductive composition for coating a current collector for a battery or an electrical double layer capacitor may be prepared in a way such that, before adding, for example, a polycarboxylic acid, a compound having active hydrogen (e.g., a hydrogen bonding functional group) and a coupling agent are reacted with each other in advance by heating.

(Surfactant)

The conductive composition for coating a current collector for a battery or an electrical double layer capacitor can contain various surfactants for adjusting the wetting properties.

With respect to the surfactant, examples of anionic surfactants include a soap, lauryl sulfate, a polyoxyethylene alkyl ether sulfate, an alkylbenzenesulfonate, a polyoxyethylene alkyl ether phosphate, a polyoxyethylene alkyl phenyl ether phosphate, an N-acylamino acid salt, an α-olefinsulfonate, an alkyl sulfate salt, an alkyl phenyl ether sulfate salt, and a methyltaurine salt, examples of amphoteric surfactants include an alkyldiaminoethylglycine hydrochloride, a 2-alkyl-N-carboxymethyl-N-hydroxyethylimidazolium betaine, betaine lauryldimethylaminoacetate, coconut oil fatty acid amide propylbetaine, fatty acid alkylbetaine, sulfobetaine, and amine oxide, and examples of nonionic surfactants include alkyl ester compounds, such as polyethylene glycol, alkyl ether compounds, such as triethylene glycol monobutyl ether, ester compounds, such as polyoxysorbitan ester, alkylphenol compounds, fluorine compounds, and silicone compounds. These compounds can be used individually or in combination.

(Insulating Filler)

In the conductive composition for coating a current collector for a battery or an electrical double layer capacitor, for improving the mechanical strength and thermal properties, if necessary, an insulating filler can be incorporated in such an amount that the required electric conduction properties are not sacrificed. Examples of insulating fillers include powders of a metal oxide, such as alumina, silica, zirconia, or titania; sols, such as colloidal silica, a titania sol, and an alumina sol; clay minerals, such as talc, kaolinite, and smectite; carbides, such as silicon carbide and titanium carbide; nitrides, such as silicon nitride, aluminum nitride, and titanium nitride; borides, such as boron nitride, titanium boride, and boron oxide; composite oxides, such as mullite; hydroxides, such as aluminum hydroxide and magnesium hydroxide; and barium titanate capable of increasing the permittivity of the conductive composition for coating a current collector for a battery or an electrical double layer capacitor.

(Stabilizer)

The conductive composition for coating a current collector for a battery or an electrical double layer capacitor, if necessary, can further contain a stabilizer appropriately selected.

Specific examples of stabilizers include phenolic antioxidants, such as 2,6-di-tert-butylphenol, 2,4-di-tert-butylphenol, 2,6-di-tert-butyl-4-ethylphenol, and 2,4-bis-(n-octylthio)-6-(4-hydroxy-3,5-di-tert-butylanilino)-1,3,5-triazine; aromatic amine antioxidants, such as an alkyldiphenylamine, N,N'-diphenyl-p-phenylenediamine, 6-ethoxy-2,2,4-trimethyl-1,2-dihydroquinoline, and N-phenyl-N'-isopropyl-p-phenylenediamine; sulfide hydroperoxide decomposers, such as dilauryl 3,3'-thiodipropionate, ditridecyl 3,3'-thiodipropionate, a bis[2-methyl-4-{3-n-alkylthiopropionyloxy}-5-tert-butylphenyl]sulfide, and 2-mercapto-5-methylbenzimidazole; phosphorus hydroperoxide decomposers, such as tris(isodecyl) phosphite, phenyldiisooctyl phosphite, diphenylisooctyl phosphite, di(nonylphenyl)pentaerythritol diphosphite, 3,5-di-tert-butyl-4-hydroxybenzyl phosphate diethyl ester, and sodium bis(4-tert-butylphenyl) phosphate; salicylate light stabilizers, such as phenyl salicylate and 4-tert-octylphenyl salicylate; benzophenone light stabilizers, such as 2,4-dihydroxybenzophenone and 2-hydroxy-4-methoxybenzophenone-5-sulfonic acid; benzotriazole light stabilizers, such as 2-(2'-hydroxy-5'-methylphenyl)benzotriazole and 2,2'-methylenebis[4-(1,1,3,3-tetramethylbutyl)-6-(2N-benzotriazol-2-yl)phenol]; hindered amine light stabilizers, such as phenyl-4-piperidinyl carbonate and bis-[2,2,6,6-tetramethyl-4-piperidinyl]sebacate; Ni light stabilizers, such as [2,2'-thio-bis(4-t-octylphenolato)]-2-ethylhexylamine-nickel-(II); cyanoacrylate light stabilizers; and oxalic anilide light stabilizers.

These compounds can be used individually or in combination.

(Contents of Arbitrary Components)

The conductive composition for coating a current collector for a battery or an electrical double layer capacitor, as mentioned above, can contain, in addition to components A, B, and C, if necessary, a solvent, another binder, a coupling agent (hereinafter, also referred to as "component D"), a surfactant (hereinafter, also referred to as "component E"), an insulating filler (hereinafter, also referred to as "component F"), and a stabilizer (hereinafter, also referred to as "component G").

From the viewpoint of surely achieving the crosslink density upon curing the conductive composition for coating a current collector for a battery or an electrical double layer capacitor and suppressing a mutual replacement reaction between elements constituting the conductive composition for coating a current collector for a battery or an electrical double layer capacitor and elements constituting the current collector, the conductive composition for coating a current collector for a battery or an electrical double layer capacitor contains, relative to 100 parts by weight of component A (preferably a vinyl carboxylate copolymer), preferably 0.01 to 20 parts by weight, more preferably 0.1 to 10 parts by weight, further preferably 0.3 to 3 parts by weight of component D (coupling agent).

From the viewpoint of surely obtaining appropriate wetting properties of the conductive composition for coating a current collector for a battery or an electrical double layer capacitor with a battery current collector and an active material layer, the conductive composition for coating a current collector for a battery or an electrical double layer capacitor contains, relative to 100 parts by weight of component A (preferably a vinyl carboxylate copolymer), preferably 0.01 to 50 parts by weight, more preferably 0.1 to 20 parts by weight, further preferably 1 to 10 parts by weight of component E (surfactant).

From the viewpoint of improving the mechanical strength and thermal properties of the cured conductive composition for coating a current collector for a battery or an electrical double layer capacitor so that the required electric conduction properties are not sacrificed, the conductive composition for coating a current collector for a battery or an electrical double layer capacitor contains, relative to 100 parts by weight of component A (preferably a vinyl carboxylate copolymer), preferably 0.001 to 10 parts by weight, more preferably 0.01 to 5 parts by weight, further preferably 0.1 to 2 parts by weight of component F (insulating filler).

From the viewpoint of stably and surely achieving excellent quality of the conductive composition for coating a current collector for a battery or an electrical double layer capacitor, the conductive composition for coating a current collector for a battery or an electrical double layer capacitor contains, relative to 100 parts by weight of component A (preferably a vinyl carboxylate copolymer), preferably 0.01 to 10 parts by weight, more preferably 0.05 to 5 parts by weight, further preferably 0.1 to 1 part by weight of component G (stabilizer).

[Preferred Physical Properties of the Conductive Composition for Coating a Current Collector for a Battery or an Electrical Double Layer Capacitor]

It is preferred that the conductive composition for coating a current collector for a battery or an electrical double layer capacitor has a K value of 3 to 90, as defined by the following formula (3) (hereinafter, also referred to as "K value"):

$$K \equiv S_v \times GPa \qquad (3)$$

wherein $S_v$ and GPa are a volume shrinkage and an elastic modulus, respectively, of the conductive composition for coating a current collector for a battery or an electrical double layer capacitor.

The K value provides a cure shrinkage stress generated when the thermosetting resin component of the conductive composition is cured, and the shrinkage stress causes the conductive auxiliary (acetylene black particles in the Example) in the conductive resin composition to penetrate the oxide layer on the surface of a current collector (aluminum foil), so that the conductive auxiliary reaches the metal layer, reducing the resistance. Therefore, the higher the shrinkage stress provided by a K value, the more excellent the effect of pressing the conductive auxiliary to the current collector, and thus a higher K value is advantageous from the viewpoint of production of an electrode having a lower resistance.

(Method for Measuring a Volume Shrinkage $S_v$)

When the conductive composition for coating a current collector for a battery or an electrical double layer capacitor is in a solution form, 15 ml of the conductive composition for coating a current collector for a battery or an electrical double layer capacitor is taken by a glass pipette and placed in a Teflon (registered trademark) tube having an inner diameter of 5 mm.

The amount of the solvent in the conductive composition for coating a current collector for a battery or an electrical double layer capacitor before placed in the Teflon tube and the amount of the conductive composition for coating a current collector for a battery or an electrical double layer capacitor taken by the glass pipette are controlled so that, after the solvent is removed by vacuum evaporation at room temperature (preferably at 20 to 30° C.), the conductive composition for coating a current collector for a battery or an electrical double layer capacitor placed in the Teflon tube has a length of Y mm in the Teflon tube (with the proviso that Y is in the range of from 9 to 13 mm).

The conductive composition for coating a current collector for a battery or an electrical double layer capacitor placed in the Teflon tube is subjected to gradual vacuum evaporation for solvent at room temperature (preferably at 20 to 30° C.) without incorporating babbles into the composition so that the conductive composition for coating a current collector for a battery or an electrical double layer capacitor placed in the Teflon tube has a length of Y mm The conductive composition for coating a current collector for a battery or an electrical double layer capacitor, which has a length of Y mm in the Teflon tube, is heated by means of an oven at a temperature for a period of time (preferably at 40 to 280° C. for 0.1 to 200 minutes, more preferably at 60 to 250° C. for 0.2 to 100 minutes, further preferably at 80 to 220° C. for 0.4 to 50 minutes), which are actually used for curing the conductive composition for coating a current collector for a battery or an electrical double layer capacitor, and is heat-cured until shrinkage in respect of the length of the conductive composition for coating a current collector for a battery or an electrical double layer capacitor in the Teflon tube is stopped, and a length L mm in the Teflon tube after the heat-curing is measured. A volume shrinkage $S_v$ (%) is determined by making a calculation using the following formula.

$$S_v = 100 \times (Y-L)/Y$$

When the conductive composition for coating a current collector for a battery or an electrical double layer capacitor is in a solid state, such as a powdery form or a flake form, the volumes of a high-pressure pressed material of the composition before and after being heat-cured can be used. In this case, the powder or flake is formed under a total load of 5 tons into pellets having a diameter of 19 to 21 mm and a thickness of 9 to 11 mm, and a volume is determined from the diameter and thickness of the formed pellets before heating, and then a volume of the pellets after heating (preferably at 40 to 280° C. for 0.1 to 200 minutes, more preferably at 60 to 250° C. for 0.2 to 100 minutes, further preferably at 80 to 220° C. for 0.4 to 50 minutes) is determined from the diameter and thickness, and thus a volume shrinkage can be determined by making a calculation.

In each of the Examples described below, the conductive composition for coating a current collector for a battery or an electrical double layer capacitor is in a solution form, and the heating is conducted under conditions at 16° C. for 80 seconds.

(Method for Measuring an Elastic Modulus GPa)

The cured material of the conductive composition for coating a current collector for a battery or an electrical double layer capacitor having a length of L mm in the Teflon tube obtained after being heat-cured is removed from the Teflon tube by splitting the Teflon tube, and a modulus of elasticity in tension of the cured material is measured according to the method described in JIS K 7113 and taken as an elastic modulus GPa.

An object of the present invention is to provide a conductive composition for coating a current collector for a battery or an electrical double layer capacitor, which composition is advantageous in that the adhesion properties (peel resistance) between a battery current collector and an active material layer are increased, as compared to those of a conventional battery, thus improving the battery or electrical double layer capacitor characteristics (cycle life and float life).

In the present invention, as basic means for achieving the task, a conductive composition for coating a current collector for a battery or an electrical double layer capacitor, which comprises a vinylsilane copolymer, a polycarboxylic acid (excluding the vinylsilane copolymer), and a conductive auxiliary, is employed.

From the viewpoint of increasing the adhesion properties (peel resistance) to improve the battery or electrical double layer capacitor characteristics (cycle life and float life), the K value of the conductive composition for coating a current collector for a battery or an electrical double layer capacitor is preferably 3 to 90, more preferably 3.2 to 20, further preferably 3.5 to 10.

Figure 2:
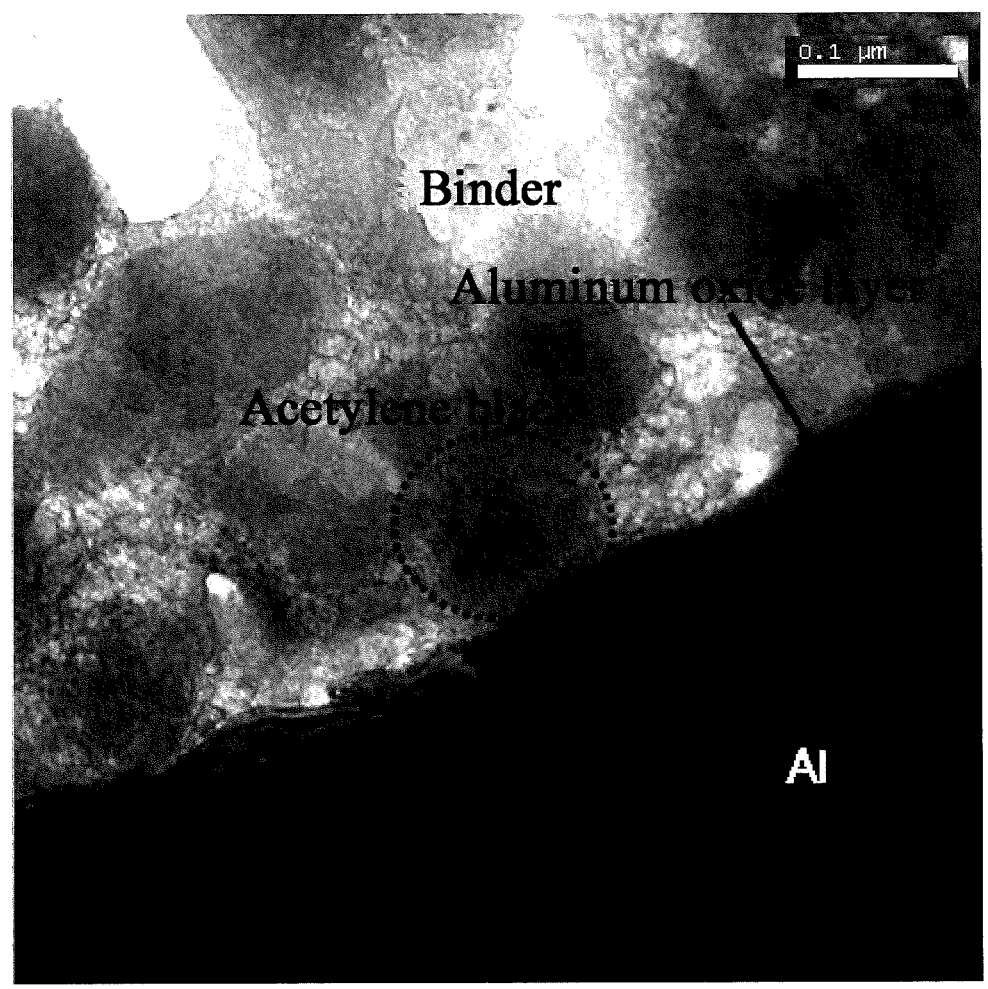
FIG. 2 is a TEM photograph showing a state in which the conductive auxiliary has penetrated the oxide and hydroxide layers on a current collector at an interface between the conductive composition for coating a current collector for a battery or an electrical double layer capacitor and the current collector coated with the composition.
Figure 3:
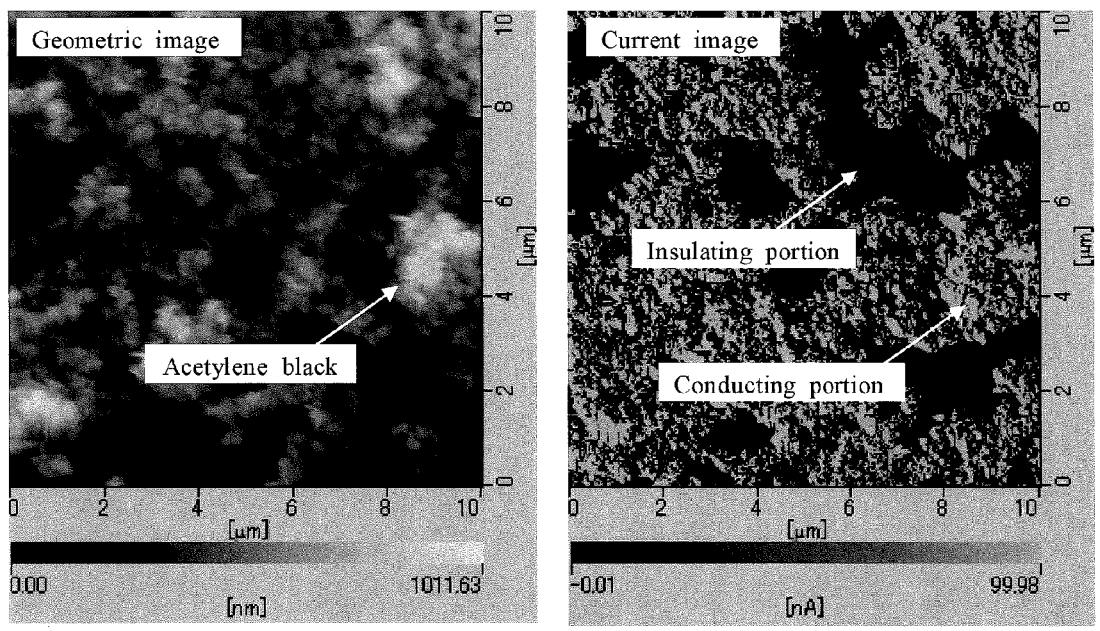
FIG. 3 shows photographs of V-I mapping using an SPM with respect to the coated surface of a current collector coated with the conductive composition for coating a current collector for a battery or an electrical double layer capacitor.

On the surface of a current collector produced using a conventional conductive composition for coating a current collector for a battery or an electrical double layer capacitor, the insulation of the hydroxide film or oxide film on the surface of the current collector may inhibit the active material layer and the current collector from adhering to each other with a satisfactorily low resistance. By contrast, in the conductive composition for coating a current collector for a battery or an electrical double layer capacitor, when the K value falls in the above-mentioned preferred range, a stress generated upon heat cure shrinkage of the conductive composition for coating a current collector for a battery or an electrical double layer capacitor causes the conductive auxiliary contained in the conductive composition for coating a current collector for a battery or an electrical double layer capacitor to penetrate an insulating layer comprising a hydroxide layer or oxide layer on the surface of a metal current collector (for example, FIGS. 2 and 3), so that a satisfactorily low resistance from a practical point of view is exhibited.

As a curing reaction which increases the volume shrinkage, a condensation reaction is preferred, and, for preventing the conducting resin layer from peeling off the current collector due to the cure stress, the use of a copolymer comprising a vinylsilane monomer and a vinyl monomer having active hydrogen and a polycarboxylic acid as a binder is highly effective from the viewpoint of achieving excellent adhesion properties of the resin layer to the metal current collector.

Further, a compound having 4 or more substituents per molecule is preferred from the viewpoint of the volume shrinkage caused due to curing and the elastic modulus after curing, and the combination of a tetrahydric or more alcohol and a tetrafunctional or more carboxylic acid is preferred as a combination for increasing the cure stress, and, for improving the volume shrinkage and elastic modulus, the combination of the above-mentioned compound having 4 or more active hydrogens and having an active hydrogen equivalent of 500 (g/mol) or less and the compound having 4 or more carboxylic acids and having a carboxylic acid equivalent of 500 (g/mol) or less is further preferred because the volume shrinkage is increased in proportion to the amount of the condensation reaction per unit volume to increase the elastic modulus.

By virtue of further using a binder having satisfactorily large adhesion force to a metal current collector and large cure shrinkage and the conductive auxiliary, the conductive composition for coating a current collector for a battery or an electrical double layer capacitor has an advantage in that a stress generated upon cure shrinkage of the thermosetting resin causes the conductive auxiliary contained in the conductive coating composition to penetrate an insulating layer comprising a hydroxide layer or oxide layer on the surface of the metal current collector, so that a coating layer exhibiting a satisfactorily low resistance from a practical point of view can be formed.

In the present invention, further, the conductive coating layer has improved adhesion properties to the active material layer and therefore chipping of the electric conduction properties is unlikely to occur when slitting the electrode, making it possible to prevent an accident caused due to short-circuiting during the use.

[Current Collector for Battery or Electrical Double Layer Capacitor and Battery or Electrical Double Layer Capacitor]

(Current Collector for Battery or Electrical Double Layer Capacitor)

The battery current collector of the present invention coated with the conductive composition for coating a current collector for a battery or an electrical double layer capacitor (hereinafter, also referred to as "battery current collector") can be produced by coating a current collector for a battery or an electrical double layer capacitor with the conductive composition for coating a current collector for a battery or an electrical double layer capacitor, which is prepared using the above-mentioned materials.

Examples of battery or electrical double layer capacitor current collectors include metals, such as gold, silver, copper, aluminum, nickel, iron, and cobalt, carbon fiber nonwoven fabric, and composite materials having electric conduction properties, such as a metal composite material. In a lithium-ion secondary battery, an aluminum foil for positive electrode and a copper foil for negative electrode are used, and, in an electrical double layer capacitor, an aluminum foil or an aluminum etched foil is used.

Coating can be made using a gravure coater, a slit die coater, a spray coater, or dipping.

From the viewpoint of stably and surely obtaining the opportunity or area for the contact of the conductive auxiliary with the battery current collector to stably achieve a low resistance, the thickness of the coating layer is preferably in the range of from 0.01 to 100 μm, further preferably in the range of from 0.05 to 5 μm from the viewpoint of achieving excellent electrical properties and excellent adhesion properties.

(Battery)

With respect to the battery of the present invention to which the battery current collector of the present invention can be applied (hereinafter, also referred to as battery), from the viewpoint of achieving an excellent effect of preventing the electrochemical deterioration caused due to the high charge potential, preferred is a lithium-ion secondary battery, a sodium-ion secondary battery, a potassium-ion secondary battery, or a magnesium-ion secondary battery, and more preferred is a lithium-ion secondary battery. Among the lithium-ion secondary batteries, in a fayalite lithium-ion secondary battery having a high internal resistance, a further excellent effect is exhibited.

The battery can be produced by a known method.

By the present invention, the adhesion force between the current collector and the active material layer can be improved, so that deterioration of the battery or electrical double layer capacitor characteristics due to peeling of the coating during the use can be prevented.

By the present invention, the resistance between the current collector and the active material layer can be reduced, enabling high-rate charge/discharge.

In the present invention, the conductive auxiliary penetrates an insulating oxide and/or hydroxide film on the surface of the current collector, and therefore, even when the prepared electrode is not pressed by roll-pressing or the like or is pressed at a reduced pressure, the resistance of the electrode can be reduced. Accordingly, the active material layer is not crashed, and the impregnation of the active material layer with an electrolytic solution and the movement of ions through the active material layer are facilitated, enabling the production of a high-rate charge/dischargeable battery.

According to the present invention, an electrochemically stable interface bonding state can be formed, and therefore, when the battery or electrical double layer capacitor is charged and discharged in many cycles repeatedly for a long term or the charged battery or capacitor is allowed to stand at a high temperature, the deterioration of the battery or electrical double layer capacitor characteristics due to electrolysis can be prevented.

The battery of the present invention is advantageous not only in that the internal resistance is low, but also in that peeling between the current collector and the active material layer is unlikely to occur, so that the battery can flow a large current, enabling quick charge/discharge.

Further, the active material layer is chemically strongly bonded to the surface of the current collector, and therefore the increase of the resistance due to the deterioration of the interface can be suppressed, and the lowering of the battery or electrical double layer capacitor characteristics in a long-term reliability test, such as a charge/discharge test or a storage test, is small.

Particularly, the vinylsilane copolymer in the present invention (preferably the vinyl carboxylate copolymer) and a polar substituent present on the surface of a current collector (for example, a hydroxyl group on a metal) together form a covalent bond, and hence excellent adhesion force and excellent electrochemical durability of the adhesion force can be obtained.

A conventional conductive composition for coating a current collector for a battery or an electrical double layer capacitor has a bonding having a siloxane structure which is easily electrochemically cleaved, and therefore cannot produce a battery having satisfactorily excellent long-term reliability. By contrast, in the composition of the present invention, silicon is bonded to the principal chain of the vinylsilane copolymer (preferably the vinyl carboxylate copolymer) through a carbon atom, and such a bonding is electrochemically stable, thus achieving excellent long-term stability.

Further, the polycarboxylic acid contained in the coating composition has an effect such that it crosslinks a substituent having active hydrogen (preferably a hydroxyl group) in the vinylsilane copolymer (preferably the vinyl carboxylate copolymer) together or with a substituent having active hydrogen (preferably a hydroxyl group) on the surface of a current collector to prevent electrochemical decomposition.

Such an electrochemically strong bonding has an effect to prevent electrochemically mutual migration between the current collector and the other materials constituting the battery, thus preventing the increase of the resistance or the lowering of the mechanical strength due to the formation of an alloy layer having a high resistance or the generation of voids.

Further, the conductive auxiliary contained in the coating composition interacts with the surface of the current collector to lower the resistance of the interface. For example, an insulating oxide film or hydroxide film is present on the surface of a metal current collector, and, when using conducting particles, a shrinkage stress generated upon drying and solidifying the composition causes the conducting particles to penetrate the insulating film, making it possible to reduce the resistance.

For causing the conducting particles to penetrate the oxide film or hydroxide film as mentioned above, both the large shrinkage stress and the high adhesion force comparable to the shrinkage stress are required.

Further, for maintaining a high adhesion force such that the state in which the conducting particles have penetrated the insulating film can be kept after a charge/discharge test, the electrochemical stability of the interface is also required.

When an ionic liquid is used, the liquid permeates through defects of the insulating film, making it possible to reduce the resistance.

EXAMPLES

Hereinbelow, the present invention will be described in more detail with reference to the following Examples, which should not be construed as limiting the scope of the present invention. The indication "part(s)" for the amount is given by weight unless otherwise specified.

Example 1

In Example 1, a method is described in which a lithium-ion secondary battery is produced using a current collector coated with a conductive composition for coating a current collector for a battery or an electrical double layer capacitor, which comprises a vinylsilane copolymer, a polycarboxylic acid, and a conductive auxiliary, with respect to both the positive electrode and negative electrode.

(Method for Synthesizing a Vinylsilane Copolymer)

In a 10 L three-neck flask having a cooler were placed 1,000 parts of methanol, 1,400 parts of vinyl acetate, and 50 parts of vinyltriethoxysilane, and, while stirring the resultant mixture, the flask was purged with dry argon gas and the temperature of the mixture was elevated to 60° C.

To the mixture was dropwise added 1,200 parts of a 3.5% methanol solution of 2,2'-azobisisobutyronitrile.

100 Parts of a 10% methanol solution of vinyltriethoxysilane was added dropwise to the resultant mixture over 5 hours to perform a polymerization.

Methanol vapor was introduced into the flask to remove the unreacted vinyl acetate monomer.

100 Parts of a 10% methanol solution of sodium hydroxide was added dropwise to the resultant reaction mixture while stirring at 40° C.

The resultant white gel was ground and washed with methanol to remove the unreacted vinyltriethoxysilane, followed by drying, to obtain a vinylsilane copolymer.

The results of an elemental analysis by ICP-AES (Inductively Coupled Plasma Atomic Emission Spectroscopy) showed that the obtained copolymer contained a vinylsilane unit in an amount of 1 mol % and 99% of the vinyl carboxylate moiety was saponified.

A molecular weight of the copolymer was measured by GPC (Gel Permeation Chromatography), and the following results were obtained: m/n=0.01, m=10, n=990.

(Preparation of a Conductive Composition for Coating a Current Collector for a Battery or an Electrical Double Layer Capacitor)

1,000 Parts of water and 5 parts of sodium hydroxide were placed in a 10 L beaker and stirred until the resultant mixture became uniform. 20 Parts of the above-obtained vinylsilane copolymer was added thereto and the resultant mixture was stirred at 80° C. for 6 hours until the mixture became uniform. 10 Parts of pyromellitic acid was added and the resultant mixture was stirred at 60° C. for 4 hours until the mixture became uniform. 25 Parts of acetylene black (manufactured by Denki Kagaku Kogyo Kabushiki Kaisha; DENKA BLACK HS-100) was added and the resultant mixture was stirred until the mixture became substantially uniform to obtain a dispersion.

The obtained dispersion was dispersed using a bead mill equipped with a cooling jacket. 0.5 mm zirconia balls were placed in the dispersion at a packing of 80%, and the dispersion was stirred at a circumferential speed of 7 m while cooling so that the temperature of the dispersion did not become 30° C. or higher, obtaining a coating composition which is a conductive composition for coating a current collector for a battery or an electrical double layer capacitor.

(Preparation of a Current Collector for a Battery or an Electrical Double Layer Capacitor Having a Conductive Coating Layer Formed Thereon)

The above-obtained coating composition was applied individually to a rolled aluminum foil (for positive electrode) having a width of 300 mm and a thickness of 20 μm and a rolled copper foil (for negative electrode) having a width of 300 mm and a thickness of 15 μm so that the applied composition had a width of 200 mm and a thickness of 10 μm, and dried in a hot-air oven at 18° C. for 30 seconds. Each of the dried coating films had a thickness of 1 μm.

(Preparation of a Positive Electrode)

In a 10 L planetary mixer equipped with a cooling jacket were placed 600 parts of a 15% NMP solution of PVdF (manufactured by Kureha Corporation; Kureha KF Polymer #1120), 1,000 parts of lithium cobalt oxide (manufactured by Nippon Chemical Industrial Co., Ltd.; C-5H), 100 parts of acetylene black (manufactured by Denki Kagaku Kogyo Kabushiki Kaisha; DENKA BLACK HS-100), and 5,000 parts of NMP, and the resultant mixture was stirred while cooling so that the temperature of the mixture did not exceed 30° C. until the mixture became uniform. The resultant active material was applied to the above-obtained current collector having a conductive coating layer formed thereon so that the applied material had a width of 180 mm and a thickness of 200 μm, and dried in a hot-air oven at 16° C. for 20 seconds. The resultant current collector was roll-pressed at a linear pressure of 500 kgf/cm. The positive electrode active material layer formed after pressed had a thickness of 20 μm.

(Preparation of a Negative Electrode)

In a 10 L planetary mixer equipped with a cooling jacket were placed 600 parts of a 15% NMP solution of PVdF (manufactured by Kureha Corporation; Kureha KF Polymer #9130), 1,100 parts of graphite (manufactured by Nippon Graphite Industries, Ltd.; CGB-200), and 4,000 parts of NMP, and the resultant mixture was stirred while cooling so that the temperature of the mixture did not exceed 30° C. until the mixture became uniform. The resultant active material was applied to the above-obtained current collector having a conductive coating layer formed thereon so that the applied material had a width of 180 mm and a thickness of 200 μm, and dried in a hot-air oven at 120° C. for 2 minutes. The resultant current collector was roll-pressed at a linear pressure of 500 kgf/cm. The negative electrode active material layer formed after pressed had a thickness of 25 μm.

(Preparation of a Lithium-ion Secondary Battery)

Each of the positive electrode and negative electrode was cut into 40 mm×50 mm so that a 10 mm region having no active material layer was included at the short side, and an aluminum tab and a nickel tab were welded by resistance welding to the metal exposed portions of the positive electrode and the negative electrode, respectively. A separator (manufactured by Celgard Co., Ltd.; #2400) was cut into a size having a width of 45 mm and a length of 120 mm, and folded in three and the positive electrode and negative electrode were disposed between the folded separator so that the positive electrode and negative electrode faced to each other, and the resultant material was disposed between an aluminum laminate cell folded in half having a width of 50 mm and a length of 100 mm, and a sealant was placed between the portions with which the tabs for the individual electrodes were in contact, and then the sealant portion and the sides perpendicular to the sealant portion were subjected to heat lamination to obtain the cell in a bag form. The resultant cell was subjected to vacuum drying in a vacuum oven at 100° C. for 12 hours, and then vacuum-impregnated with a 1 M electrolytic solution comprising lithium hexafluorophosphate/EC:DEC=1:1 (manufactured by Kishida Chemical Co., Ltd.; LBG-96533) in a dry glove box, and then the excess electrolytic solution was withdrawn, followed by sealing using a vacuum sealer, to produce a lithium-ion battery.

Example 2

In Example 2, a method is described in which a lithium-ion secondary battery is produced using a current collector coated with a conductive composition for coating a current collector for a battery or an electrical double layer capacitor, which comprises a vinylsilane copolymer, a polycarboxylic acid, and a conductive auxiliary, with respect to the positive electrode.

(Preparation of a Lithium-Ion Secondary Battery)

A lithium-ion battery was produced in substantially the same manner as in Example 1 except that the conductive coating layer was not fanned with respect to the negative electrode.

Example 3

In Example 3, a method is described in which a lithium-ion secondary battery is produced using a current collector coated with a conductive composition for coating a current collector for a battery or an electrical double layer capacitor, which comprises a vinylsilane copolymer, a polycarboxylic acid, and a conductive auxiliary, with respect to the negative electrode.

(Preparation of a Lithium-Ion Secondary Battery)

A lithium-ion battery was produced in substantially the same manner as in Example 1 except that the conductive coating layer was not formed with respect to the positive electrode.

Example 4

In Example 4, a method is described in which a lithium-ion secondary battery is produced using a current collector coated with a conductive composition for coating a current collector for a battery or an electrical double layer capacitor, which comprises a vinylsilane copolymer in which the ratio of m is larger than that in Example 1 so that the silicon content is increased, a polycarboxylic acid, and a conductive auxiliary.

(Method for Synthesizing a Vinylsilane Copolymer)

In a 10 L three-neck flask having a cooler were placed 1,200 parts of methanol, 1,400 parts of vinyl acetate, and 200 parts of vinyltriethoxysilane, and, while stirring the resultant mixture, the flask was purged with dry argon gas and the temperature of the mixture was elevated to 60° C.

To the mixture was dropwise added 1,300 parts of a 3.7% methanol solution of 2,2'-azobisisobutyronitrile.

200 Parts of a 10% methanol solution of vinyltriethoxysilane was added dropwise to the resultant mixture over 5 hours to perform a polymerization.

Methanol vapor was introduced into the flask to remove the unreacted vinyl acetate monomer. 150 Parts of a 10% methanol solution of sodium hydroxide was added dropwise to the resultant reaction mixture while stirring at 40° C.

The resultant white gel was ground and washed with methanol to remove the unreacted vinyltriethoxysilane, followed by drying, to obtain a vinylsilane copolymer.

The results of an elemental analysis by ICP-AES (Inductively Coupled Plasma Atomic Emission Spectroscopy) showed that the obtained copolymer contained a vinylsilane unit in an amount of 2.5 mol % and 99% of the vinyl carboxylate moiety was saponified.

A molecular weight of the copolymer was measured by GPC (Gel Permeation Chromatography), and the following results were obtained: m/n=0.026, m=25, n=975.

(Preparation of a Lithium-ion Secondary Battery)

A lithium-ion battery was produced in substantially the same manner as in Example 1 except that a conductive composition for coating a current collector for a battery or an electrical double layer capacitor was prepared using the above-obtained vinylsilane copolymer in which m/n=0.026 instead of the vinylsilane copolymer in which m/n=0.01.

Example 5

In Example 5, a method is described in which a lithium-ion secondary battery is produced using a current collector coated with a conductive composition for coating a current collector for a battery or an electrical double layer capacitor, which comprises a vinylsilane copolymer in which the saponification degree is lower than that in Example 1, a polycarboxylic acid, and a conductive auxiliary.

(Method for Synthesizing a Vinylsilane Copolymer)

In a 10 L three-neck flask having a cooler were placed 1,000 parts of methanol, 1,400 parts of vinyl acetate, and 50 parts of vinyltriethoxysilane, and, while stirring the resultant mixture, the flask was purged with dry argon gas and the temperature of the mixture was elevated to 60° C.

To the mixture was dropwise added 1,200 parts of a 3.5% methanol solution of 2,2'-azobisisobutyronitrile.

100 Parts of a 10% methanol solution of vinyltriethoxysilane was added dropwise to the resultant mixture over 5 hours to perform a polymerization.

Methanol vapor was introduced into the flask to remove the unreacted vinyl acetate monomer.

60 Parts of a 10% methanol solution of sodium hydroxide was added dropwise to the resultant reaction mixture while stirring at 40° C.

The resultant white gel was ground and washed with methanol to remove the unreacted vinyltriethoxysilane, followed by drying, to obtain a vinylsilane copolymer.

The results of an elemental analysis by ICP-AES (Inductively Coupled Plasma Atomic Emission Spectroscopy) showed that the obtained copolymer contained a vinylsilane unit in an amount of 1 mol % and 75% of the vinyl carboxylate moiety was saponified.

A molecular weight of the copolymer was measured by GPC (Gel Permeation Chromatography), and the following results were obtained: m/n=0.01, m=10, n=990.

(Preparation of a Lithium-Ion Secondary Battery)

A lithium-ion battery was produced in substantially the same manner as in Example 1 except that a conductive composition for coating a current collector for a battery or an electrical double layer capacitor was prepared using the above-obtained vinylsilane copolymer having a saponification of 75% instead of the vinylsilane copolymer having a saponification of 99%.

Example 6

In Example 6, a method in which a lithium-ion secondary battery is produced using the positive electrode having no acetylene black incorporated is described.

The interaction between acetylene black contained in the active material layer and a current collector assists in the electronic conduction, but the active material must be reduced by the amount of the acetylene black contained, and therefore the resultant battery is inevitably reduced in capacity. The conductive composition of the present invention for coating a current collector for a battery or an electrical double layer capacitor takes charge of the electron exchange between the active material and the current collector, and therefore, by using the conductive composition of the present invention for coating a current collector for a battery or an electrical double layer capacitor, it is possible to remove acetylene black in the active material, so that the amount of the active material can be increased. Comparative Example showed results that, in the case where the conductive composition of the present invention for coating a current collector for a battery or an electrical double layer capacitor was not used, when acetylene black was not contained in the active material, the charge/discharge characteristics were extremely poor.

(Preparation of a Positive Electrode)

In a 10 L planetary mixer equipped with a cooling jacket were placed 600 parts of a 15% NMP solution of PVdF (manufactured by Kureha Corporation; Kureha KF Polymer #1120), 1,000 parts of lithium cobalt oxide (manufactured by Nippon Chemical Industrial Co., Ltd.; C-5H), and 4,700 parts of NMP, and the resultant mixture was stirred while cooling so that the temperature of the mixture did not exceed 30° C. until the mixture became uniform. The resultant active material was applied to the above-mentioned current collector having a conductive coating layer foamed thereon so that the applied material had a width of 180 mm and a thickness of 200 μm, and dried in a hot-air oven at 160° C. for 20 seconds. The resultant current collector was roll-pressed at a linear pressure of 500 kgf/cm. The positive electrode active material layer formed after pressed had a thickness of 20 μm.

(Preparation of a Lithium-ion Secondary Battery)

A lithium-ion battery was produced in substantially the same manner as in Example 1 except that the above-obtained positive electrode containing no acetylene black in the active material was used.

Example 7

In Example 7, a method is described in which a lithium-ion secondary battery is produced using a current collector coated with a conductive composition for coating a current collector for a battery or an electrical double layer capacitor, which comprises a vinylsilane copolymer in which sodium in the vinylsilane copolymer is replaced by lithium, a polycarboxylic acid, and a conductive auxiliary, with respect to both the positive electrode and negative electrode.

(Method for Synthesizing a Li-type Vinylsilane Copolymer)

In a 10 L three-neck flask having a cooler were placed 1,000 parts of methanol, 1,400 parts of vinyl acetate, and 50 parts of vinyltriethoxysilane, and, while stirring the resultant mixture, the flask was purged with dry argon gas and the temperature of the mixture was elevated to 60° C.

To the mixture was dropwise added 1,200 parts of a 3.5% methanol solution of 2,2'-azobisisobutyronitrile.

100 Parts of a 10% methanol solution of vinyltriethoxysilane was added dropwise to the resultant mixture over 5 hours to perform a polymerization.

Methanol vapor was introduced into the flask to remove the unreacted vinyl acetate monomer.

250 Parts of a 5% methanol solution of lithium hydroxide was added dropwise to the resultant reaction mixture while stirring at 40° C., and, after completion of the addition, the mixture was stirred at 60° C. for 5 hours.

The resultant white gel was ground and washed with methanol to remove the unreacted vinyltriethoxysilane, followed by drying, to obtain a Li-type vinylsilane copolymer.

The results of an elemental analysis by ICP-AES (Inductively Coupled Plasma Atomic Emission Spectroscopy) showed that the obtained copolymer contained lithium in an amount of 5% by weight and a vinylsilane unit in an amount of 1 mol %, and 98% of the vinyl carboxylate moiety was saponified.

A molecular weight of the copolymer was measured by GPC (Gel Permeation Chromatography), and the following results were obtained: m/n=0.01, m=10, n=990.

(Preparation of a Lithium-ion Secondary Battery)

A lithium-ion battery was produced in substantially the same manner as in Example 1 except that a conductive composition for coating a current collector for a battery or an electrical double layer capacitor was prepared using the above-obtained Li-type vinylsilane copolymer instead of the vinylsilane copolymer.

Example 8

In Example 8, a method is described in which a lithium-ion secondary battery is produced using a current collector coated with a conductive composition for coating a current collector for a battery or an electrical double layer capacitor, which comprises a vinylsilane copolymer using γ-acryloxypropyltrimethoxysilane as a vinylsilane monomer, a polycarboxylic acid, and a conductive auxiliary, with respect to both the positive electrode and negative electrode.

(Method for Synthesizing a Vinylsilane Copolymer)

In a 10 L three-neck flask having a cooler were placed 1,000 parts of methanol, 1,400 parts of vinyl acetate, and 120 parts of γ-acryloxypropyltrimethoxysilane, and, while stirring the resultant mixture, the flask was purged with dry argon gas and the temperature of the mixture was elevated to 60° C.

To the mixture was dropwise added 1,200 parts of a 3.6% methanol solution of 2,2'-azobisisobutyronitrile.

Methanol vapor was introduced into the flask to remove the unreacted vinyl acetate monomer.

200 Parts of a 5% methanol solution of sodium hydroxide was added dropwise to the resultant reaction mixture while stirring at 40° C., and, after completion of the addition, the mixture was stirred at 60° C. for 5 hours.

The resultant white gel was ground and washed with methanol to remove the unreacted γ-acryloxypropyltrimethoxysilane, followed by drying, to obtain a γ-acryloxypropyltrimethoxysilane-type vinylsilane copolymer.

The results of an elemental analysis by ICP-AES (Inductively Coupled Plasma Atomic Emission Spectroscopy) showed that the obtained copolymer contained a γ-acryloxypropyltrimethoxysilane unit in an amount of 1 mol % and 90% of the vinyl carboxylate moiety was saponified.

A molecular weight of the copolymer was measured by GPC (Gel Permeation Chromatography), and the following results were obtained: m/n=0.01, m=10, n=990.

(Preparation of a Lithium-ion Secondary Battery)

A lithium-ion battery was produced in substantially the same manner as in Example 1 except that a conductive composition for coating a current collector for a battery or an electrical double layer capacitor was prepared using the above-obtained γ-acryloxypropyltrimethoxysilane-type vinylsilane copolymer instead of the vinylsilane copolymer.

Example 9

In Example 9, a method is described in which a lithium-ion secondary battery is produced using a current collector coated with a conductive composition for coating a current collector for a battery or an electrical double layer capacitor, which comprises limonene oxide, a vinylsilane copolymer, a polycarboxylic acid, and a conductive auxiliary, with respect to both the positive electrode and negative electrode.

When a polycarboxylic acid and a hydroxyl group undergo a dehydration-condensation, an ester linkage is formed, so that two functional groups having a hydrogen bonding property disappear (A).

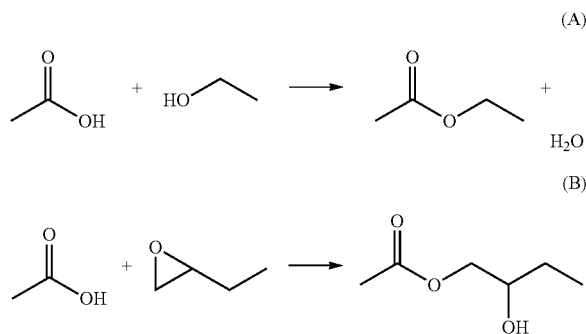

On the other hand, when limonene oxide (epoxy group) is reacted with a polycarboxylic acid, a hydroxyl group remains even after the reaction as shown in the above structure (B), and thus one functional group having a hydrogen bonding property can remain. The hydrogen bonding functional group causes a hydrogen bond to improve the resistance to electrolytic solution, and hence is advantageous form this point of view.

(Method for Synthesizing a Vinylsilane Copolymer)

In a 10 L three-neck flask having a cooler were placed 1,200 parts of methanol, 1,400 parts of vinyl acetate, 200 parts of vinyltriethoxysilane, and 100 parts of limonene oxide, and, while stirring the resultant mixture, the flask was purged with dry argon gas and the temperature of the mixture was elevated to 60° C.

To the mixture was dropwise added 1,300 parts of a 3.7% methanol solution of 2,2'-azobisisobutyronitrile.

200 Parts of a 10% methanol solution of vinyltriethoxysilane was dropwise added to the resultant mixture over 5 hours to perform a polymerization.

Methanol vapor was introduced into the flask to remove the unreacted vinyl acetate monomer. 150 Parts of a 10% methanol solution of sodium hydroxide was added dropwise to the resultant reaction mixture while stirring at 40° C.

The resultant white gel was ground and washed with methanol to remove the unreacted vinyltriethoxysilane, followed by drying, to obtain a vinylsilane copolymer.

The results of an elemental analysis by ICP-AES (Inductively Coupled Plasma Atomic Emission Spectroscopy) showed that the obtained copolymer contained a vinylsilane unit in an amount of 2.2 mol % and a limonene oxide unit in an amount of 1.3 mol %, and 99% of the vinyl carboxylate moiety was saponified.

A molecular weight of the copolymer was measured by GPC (Gel Permeation Chromatography), and the following results were obtained: $m/n=0.022$, $m=24$, $n=1,076$.

(Preparation of a Lithium-ion Secondary Battery)

A lithium-ion battery was produced in substantially the same manner as in Example 1 except that a conductive composition for coating a current collector for a battery or an electrical double layer capacitor was prepared using the above-obtained vinylsilane copolymer instead of the vinylsilane copolymer in which $m/n=0.01$.

Example 10

In Example 10, a method is described in which a lithium-ion secondary battery is produced using a current collector having both the positive electrode and negative electrode coated with a conductive composition for coating a current collector for a battery or an electrical double layer capacitor, which comprises a vinylsilane copolymer comprising sodium 2-acrylamido-2-methylpropanesulfonate (specific functional group-containing monomer), a vinylsilane monomer, and vinyl acetate, a polycarboxylic acid, and a conductive auxiliary.

(Method for Synthesizing a Vinylsilane Copolymer)

In a 10 L three-neck flask having a cooler were placed 1,000 parts of vinyl acetate, 10 parts of vinyltrimethoxysilane, 2,500 parts of methanol, and 3 parts of sodium 2-acrylamido-2-methylpropanesulfonate, and the flask was purged with dry argon gas and the temperature of the resultant mixture was elevated to 60° C. To the mixture was dropwise added 400 parts of a 3.7% methanol solution of 2,2'-azobisisobutyronitrile. 200 Parts of a 10% methanol solution of vinyltriethoxysilane was added dropwise to the resultant mixture over 5 hours to perform a polymerization. Methanol vapor was introduced into the flask to remove the unreacted vinyl acetate monomer. 150 Parts of a 10% methanol solution of sodium hydroxide was added dropwise to the resultant reaction mixture while stirring at 40° C. The resultant white gel was ground and washed with methanol to remove the unreacted vinyltriethoxysilane, followed by drying, to obtain a vinylsilane copolymer. The results of an elemental analysis by ICP-AES (Inductively Coupled Plasma Atomic Emission Spectroscopy) showed that the obtained copolymer contained a vinylsilane unit in an amount of 1.5 mol % and a sulfonic acid unit in an amount of 1 mol %, and 99% of the vinyl carboxylate moiety was saponified. A molecular weight of the copolymer was measured by GPC (Gel Permeation Chromatography), and the following results were obtained: $m/n=0.01$, $m=15$, $n=1,485$.

(Preparation of a Lithium-ion Secondary Battery)

A lithium-ion battery was produced in substantially the same manner as in Example 1 except that a conductive composition for coating a current collector for a battery or an electrical double layer capacitor was prepared using the above-obtained vinylsilane copolymer instead of the vinylsilane copolymer having a sulfonic acid unit.

Example 11

In Example 11, a method is described in which an electrical double layer capacitor is produced using a current collector coated with a conductive composition for coating a current collector for a battery or an electrical double layer capacitor, which comprises a vinylsilane copolymer, a polycarboxylic acid, and a conductive auxiliary.

(Conductive Composition for Coating a Current Collector for a Battery or an Electrical Double Layer Capacitor)

A conductive composition for coating a current collector for a battery or an electrical double layer capacitor was produced by the same method as in Example 1.

(Preparation of a Current Collector Having a Conductive Coating Layer Formed Thereon)

The above-produced coating composition was applied to a rolled aluminum foil having a width of 300 mm and a thickness of 20 μm so that the applied composition had a width of 200 mm and a thickness of 10 μm, and dried in a hot-air oven at 180° C. for 30 seconds. The dried coating film had a thickness of 1 μm.

(Preparation of an Electrode)

In a 10 L planetary mixer equipped with a cooling jacket were placed 3,000 parts of a 15% NMP solution of PVdF (manufactured by Kureha Corporation; Kureha KF Polymer #1120), 1,500 parts of activated carbon (manufactured by Kuraray Chemical Co., Ltd.; Kuraraycoal RP-20), and 2,500 parts of NMP, and the resultant mixture was stirred while cooling so that the temperature of the mixture did not exceed 30° C. until the mixture became uniform. The resultant active material was applied to the above-obtained current collector having a conductive coating layer formed thereon so that the applied material had a width of 180 mm and a thickness of 200 µm, and dried in a hot-air oven at 160° C. for 20 seconds. The resultant current collector was roll-pressed at a linear pressure of 500 kgf/cm. The electrode active material layer formed after pressed had a thickness of 20 µm.

(Preparation of an Electrical Double Layer Capacitor)

The electrode was cut into 40 mm×50 mm so that a 10 mm region having no active material layer was included at the short side, and an aluminum tab was welded to the metal exposed portion by resistance welding. A separator (manufactured by Celgard Co., Ltd.; #2400) was cut into a size having a width of 45 mm and a length of 120 mm, and folded in three and the two electrodes were disposed between the folded separator so that the electrodes faced to each other, and the resultant material was disposed between an aluminum laminate cell folded in half having a width of 50 mm and a length of 100 mm, and a sealant was placed between the portions with which the tabs for the individual electrodes were in contact, and then the sealant portion and the sides perpendicular to the sealant portion were subjected to heat lamination to obtain the cell in a bag form. The resultant cell was subjected to vacuum drying in a vacuum oven at 100° C. for 12 hours, and then vacuum-impregnated with a 1M electrolytic solution comprising tetraethylammonium borofluoride/PC (manufactured by Kishida Chemical Co., Ltd.; CPG-00005) in a dry glove box, and then the excess electrolytic solution was withdrawn, followed by sealing using a vacuum sealer, to produce an electrical double layer capacitor.

Example 12

In Example 12, a method is described in which an electrical double layer capacitor is produced using a current collector coated with a conductive composition for coating a current collector for a battery or an electrical double layer capacitor, which comprises a vinylsilane copolymer in which part of sodium in the vinylsilane copolymer is replaced by tetraethylammonium, a polycarboxylic acid, and a conductive auxiliary.

(Method for Synthesizing a Tetraethylammonium-type Vinylsilane Copolymer)

100 Parts of the vinylsilane copolymer produced in Example 1 was dissolved in 9,900 parts of ion-exchanged water while heating at 80° C. for 12 hours, followed by cooling to room temperature. 5 Parts of tetraethylammonium chloride was added to the solution and the resultant mixture was stirred for 30 minutes. 500 Parts of an ion-exchange resin (manufactured by Mitsubishi Chemical Corporation; AMP01) was added thereto and the resultant mixture was stirred for 12 hours. The ion-exchange resin was removed from the mixture, followed by removal of moisture by vacuum distillation, to obtain a tetraethylammonium-type vinylsilane copolymer. It was found that 70% of sodium in the vinylsilane copolymer was replaced by tetraethylammonium.

(Preparation of a Conductive Composition for Coating a Current Collector for a Battery or an Electrical Double Layer Capacitor)

A conductive composition for coating a current collector for a battery or an electrical double layer capacitor was produced by substantially the same method as in Example 1 except that a tetraethylammonium-type vinylsilane copolymer was used as a vinylsilane copolymer, obtaining a coating composition.

(Preparation of a Current Collector Having a Conductive Coating Layer Formed Thereon)

A current collector having a conductive coating layer formed thereon was produced by substantially the same method as in Example 11 except that the above-obtained coating composition was used.

(Preparation of an Electrode)

An electrode was produced by substantially the same method as in Example 8 except that the above-produced current collector having a conductive coating layer formed thereon was used.

(Preparation of an Electrical Double Layer Capacitor)

An electrical double layer capacitor was produced by substantially the same method as in Example 11 except that the above-produced electrode was used.

Comparative Example 1

A lithium-ion secondary battery was produced by substantially the same method as in Example 1 except that a current collector which was not coated with a conductive composition for coating a current collector for a battery or an electrical double layer capacitor was used.

Comparative Example 2

In Comparative Example 2, a method is described in which a lithium-ion secondary battery is produced using a current collector coated with a conductive composition for coating a current collector for a battery or an electrical double layer capacitor, which comprises a partially saponified polyvinyl alcohol instead of the vinylsilane copolymer, and a conductive auxiliary, with respect to both the positive electrode and negative electrode.

(Preparation of a Conductive Composition for Coating a Current Collector for a Battery or an Electrical Double Layer Capacitor)

1,100 Parts of water and 20 parts of a partially saponified polyvinyl alcohol (manufactured by Kuraray Co., Ltd.; KURARAY POVAL PVA 235 (saponification degree: 87 to 89%)) were placed in a 10 L beaker and stirred at 80° C. for 6 hours until the resultant mixture became uniform. Parts of acetylene black (manufactured by Denki Kagaku Kogyo Kabushiki Kaisha; DENKA BLACK HS-100) was added thereto and the resultant mixture was stirred until the mixture became substantially uniform to obtain a dispersion. The obtained dispersion was dispersed using a bead mill equipped with a cooling jacket. 0.5 mm zirconia balls were placed in the dispersion at a packing of 80%, and the dispersion was stirred at a circumferential speed of 7 m while cooling so that the temperature of the dispersion did not become 30° C. or higher, obtaining a coating composition which is a conductive composition for coating a current collector for a battery or an electrical double layer capacitor.

(Method for Producing a Lithium-ion Secondary Battery)

A lithium-ion secondary battery was produced by substantially the same method as in Example 1 except that a current collector was coated with the above-obtained conductive composition for coating a current collector for a battery or an electrical double layer capacitor.

Comparative Example 3

In Comparative Example 3, a method is described in which a lithium-ion secondary battery is produced using a current collector coated with a conductive composition for coating a current collector for a battery or an electrical double layer capacitor, which comprises a partially saponified polyvinyl alcohol instead of the vinylsilane copolymer, a polycarboxylic acid, and a conductive auxiliary, with respect to both the positive electrode and negative electrode.

(Preparation of a Conductive Composition for Coating a Current Collector for a Battery or an Electrical Double Layer Capacitor)

1,000 Parts of water and 20 parts of a partially saponified polyvinyl alcohol (manufactured by Kuraray Co., Ltd.; KURARAY POVAL PVA 235) were placed in a 10 L beaker and stirred at 80° C. for 6 hours until the resultant mixture became uniform. 10 Parts of pyromellitic acid was added thereto and the resultant mixture was stirred at 60° C. for 4 hours until the mixture became uniform. 25 Parts of acetylene black (manufactured by Denki Kagaku Kogyo Kabushiki Kaisha; DENKA BLACK HS-100) was added and the resultant mixture was stirred until the mixture became substantially uniform to obtain a dispersion. The obtained dispersion was dispersed using a bead mill equipped with a cooling jacket. 0.5 mm zirconia balls were placed in the dispersion at a packing of 80%, and the dispersion was stirred at a circumferential speed of 7 m while cooling so that the temperature of the dispersion did not become 30° C. or higher, obtaining a coating composition which is a conductive composition for coating a current collector for a battery or an electrical double layer capacitor.

(Method for Producing a Lithium-ion Secondary Battery)

A lithium-ion secondary battery was produced by substantially the same method as in Example 1 except that a current collector was coated with the above-obtained conductive composition for coating a current collector for a battery or an electrical double layer capacitor.

Comparative Example 4

In Comparative Example 4, a method is described in which a lithium-ion secondary battery is produced using a current collector coated with a conductive composition for coating a current collector for a battery or an electrical double layer capacitor, which comprises a partially saponified polyvinyl alcohol instead of the vinylsilane copolymer, a polycarboxylic acid, a conductive auxiliary, and a silane coupling agent, with respect to both the positive electrode and negative electrode.

(Preparation of a Conductive Composition for Coating a Current Collector for a Battery or an Electrical Double Layer Capacitor)

1,000 Parts of water, 20 parts of a partially saponified polyvinyl alcohol (manufactured by Kuraray Co., Ltd.; KURARAY POVAL PVA 235), and 1 part of a silane coupling agent (manufactured by Shin-Etsu Chemical Co., Ltd.; KBM-403) were placed in a 10 L beaker and stirred at 80° C. for 6 hours until the resultant mixture became uniform. 10 Parts of pyromellitic acid was added thereto and the resultant mixture was stirred at 60° C. for 4 hours until the mixture became uniform. 25 Parts of acetylene black (manufactured by Denki Kagaku Kogyo Kabushiki Kaisha; DENKA BLACK HS-100) was added and the resultant mixture was stirred until the mixture became substantially uniform to obtain a dispersion. The obtained dispersion was dispersed using a bead mill equipped with a cooling jacket. 0.5 mm zirconia balls were placed in the dispersion at a packing of 80%, and the dispersion was stirred at a circumferential speed of 7 m while cooling so that the temperature of the dispersion did not become 30° C. or higher, producing a conductive composition for coating a current collector for a battery or an electrical double layer capacitor.

(Method for Producing a Lithium-ion Secondary Battery)

A lithium-ion secondary battery was produced by substantially the same method as in Example 1 except that a current collector was coated with the above-produced conductive composition for coating a current collector for a battery or an electrical double layer capacitor.

(Results of the Measurement)

A cycle life was found to be 80 cyc. When the resultant battery was further charged and discharged in 500 cyc, the layer of the conductive composition for coating a current collector for a battery or an electrical double layer capacitor was removed from the aluminum foil on the surface of the electrode. The reason for this resides in that there is no adhesion force between the conductive composition for coating a current collector for a battery or an electrical double layer capacitor and the aluminum foil.

After the peeling test, with respect to the peeled surface on the aluminum current collector side and the peeled surface on the conductive coating side, an amount of silicon was measured using the conductive composition for coating a current collector for a battery or an electrical double layer capacitor PS. As a result, silicon was detected on the aluminum current collector side, but almost no silicon was detected on the conductive coating side. These results showed that a cleavage reaction of formula (B) occurred to cause the peeling.

Comparative Example 5

In Comparative Example 5, a method is described in which a lithium-ion secondary battery is produced using a current collector having both the positive electrode and negative electrode coated with a conductive composition for coating a current collector for a battery or an electrical double layer capacitor, which does not contain the polycarboxylic acid used in Example 1.

(Preparation of a Conductive Composition for Coating a Current Collector for a Battery or an Electrical Double Layer Capacitor)

1,100 Parts of water and 5 parts of sodium hydroxide were placed in a 10 L beaker and stirred until the resultant mixture became uniform. 20 Parts of the vinylsilane copolymer produced by the method in Example 1 was added thereto and the resultant mixture was stirred at 80° C. for 6 hours until the mixture became uniform. 25 Parts of acetylene black (manufactured by Denki Kagaku Kogyo Kabushiki Kaisha; DENKA BLACK HS-100) was added and the resultant mixture was stirred until the mixture became substantially uniform to obtain a dispersion.

The obtained dispersion was dispersed using a bead mill equipped with a cooling jacket. 0.5 mm zirconia balls were placed in the dispersion at a packing of 80%, and the dispersion was stirred at a circumferential speed of 7 m while cooling so that the temperature of the dispersion did not become 30° C. or higher, obtaining a coating composition which is a conductive composition for coating a current collector for a battery or an electrical double layer capacitor.

(Method for Producing a Lithium-ion Secondary Battery)

A lithium-ion secondary battery was produced by substantially the same method as in Example 1 except that a current collector was coated with the above-obtained conductive composition for coating a current collector for a battery or an electrical double layer capacitor.

Comparative Example 6

In Comparative Example 6, a method in which a lithium-ion secondary battery is produced using a current collector having a surface treated with a silane coupling agent is described.

(Preparation of a Current Collector Coated with a Silane Coupling Agent)

A 1% methanol solution of a silane coupling agent (manufactured by Shin-Etsu Chemical Co., Ltd.; KBM-403) was applied individually to a rolled aluminum foil having a width of 300 mm and a thickness of 20 μm and a rolled copper foil having a width of 300 mm and a thickness of 15 so that the applied solution had a width of 200 mm and a thickness of 10 μm, and dried in a hot-air oven at 18° C. for 30 seconds. The dried coating film had a thickness of about 0.2 μm.

(Method for Producing a Lithium-ion Secondary Battery)

A lithium-ion secondary battery was produced by substantially the same method as in Example 1 except that a current collector coated with the above-mentioned silane coupling agent was used.

Comparative Example 7

In Comparative Example 7, a method is described in which a lithium-ion secondary battery is produced using a current collector which is not coated with a conductive composition for coating a current collector for a battery or an electrical double layer capacitor, and using the positive electrode having no acetylene black incorporated.

(Method for Producing a Lithium-ion Secondary Battery)

A lithium-ion secondary battery was produced by substantially the same method as in Example 6 except that a current collector which was not coated with a conductive composition for coating a current collector for a battery or an electrical double layer capacitor was used.

Comparative Example 8

In Comparative Example 8, a method is described in which an electrical double layer capacitor is produced using a current collector which is not coated with a conductive composition for coating a current collector for a battery or an electrical double layer capacitor.

(Method for Producing an Electrical Double Layer Capacitor)

An electrical double layer capacitor was produced by substantially the same method as in Example 11 except that a current collector which was not coated with a conductive composition for coating a current collector for a battery or an electrical double layer capacitor was used.

Comparative Example 9

In Comparative Example 9, a method in which an electrical double layer capacitor is produced using an etched foil is described.

(Method for Producing an Electrical Double Layer Capacitor)

An electrical double layer capacitor was produced by substantially the same method as in Example 11 except that an aluminum etched foil (width: 300 mm; thickness: 20 μm) for electrical double layer capacitor was used as a current collector.

[Measurement of the Characteristics of a Lithium-ion Secondary Battery]

With respect to each of the lithium-ion secondary batteries produced in the above Examples and Comparative Examples, the following characteristics were measured.

(Measurement of Initial Capacity)

For obtaining an initial capacity, charging was conducted at a constant current of 0.01 mA until the voltage became 4.3 V, and then charging was conducted at a constant voltage of 4.3 V for 2 hours. Subsequently, discharging was conducted at a constant current of 0.01 mA until the voltage became 3 V. A series of the above operations was repeated three times, and the discharge capacity at the 3rd cycle was taken as an initial capacity.

(Initial Internal Resistance)

The potential of the cell obtained after measuring an initial capacity was increased to 4.3 V, and, as an initial internal resistance, an impedance at 1 kHz was measured with a voltage change of ±10 mV from the above potential as a center.

(Rate Characteristics)

Discharge rates were individually determined from the initial capacity, and a discharge capacity was measured for each of the discharge rates. In each charging operation, charging was conducted at a constant current over 10 hours until the voltage was increased to 4.3 V, and then charging was conducted at a constant voltage of 4.3 V for 2 hours. Subsequently, discharging was conducted at a constant current over 10 hours until the voltage became 3 V, and the discharge capacity obtained at that time was taken as a discharge capacity for 0.1 C. Next, the same charging operation was conducted and then, discharging was conducted at a current at which discharging was completed in one hour from the discharge capacity determined for 0.1 C, and the discharge capacity determined at that time was taken as a discharge capacity for 1 C. Similarly, discharge capacities for 3 C, 10 C, and 30 C were individually determined, and, taking the discharge capacity for 0.1 C as 100%, a capacity maintaining ratio was determined by making a calculation.

(Cycle Life)

A charge/discharge test in which charging was conducted at 1 C until the voltage became 4.3 V and charging was conducted at a constant voltage of 4.3 V for 2 hours and then discharging was conducted at 1 C was performed. In this instance, a percentage of the discharge capacity to that in the first discharge was calculated, and the number of charge/discharge cycles at which the capacity was reduced to less than 80% was determined as a life.

(Float Test)

Charging was conducted at 0.1 C at 60° C. until the voltage became 4.3 V, and a change of the impedance at a constant voltage of 4.3 V was measured substantially on alternate days. A period of time until the resistance was increased two times was determined as a life.

(Peeling Test of the Electrode after Durability Test)

A battery was subjected to 1,000-cycle charge/discharge durability test under conditions for the above-mentioned cycle life, and, after the durability test, the resultant battery was disassembled to check whether or not the active material layer was removed from the positive electrode and negative electrode.

Evaluations were made in accordance with the following criteria.

⊚: No removal is observed.
○: A partial removal is observed, but the current collector is not exposed.
Δ: A removal proceeds, and part of the current collector is exposed.
X: The active material layer is completely removed.

[Measurement of the Characteristics of an Electrical Double Layer Capacitor]

With respect to each of the electrical double layer capacitors produced in the above Examples and Comparative Examples, the following characteristics were measured.

(Measurement of Initial Capacity)

For obtaining an initial capacity, charging was conducted at a constant current of 0.01 mA until the voltage became 2 V. Subsequently, discharging was conducted at a constant current of 0.01 mA until the voltage became 0 V. A series of the above operations was repeated three times, and the discharge capacity at the 3rd cycle was taken as an initial capacity.

(Initial Internal Resistance)

The potential of the cell obtained after measuring an initial capacity was increased to 2 V, and, as an initial internal resistance, an impedance at 1 kHz was measured with a voltage change of ±10 mV from the above potential as a center.

(Rate Characteristics)

Discharge rates were individually determined from the initial capacity, and a discharge capacity was measured for each of the discharge rates. In each charging operation, charging was conducted at a constant current over one hour until the voltage was increased to 2 V. Subsequently, discharging was conducted at a constant current over one hour until the voltage became 0 V, and the discharge capacity obtained at that time was taken as a discharge capacity for 1 C. Next, the same charging operation was conducted and then, discharging was conducted at a current at which discharging was completed in 0.1 hour from the discharge capacity determined for 1 C, and the discharge capacity determined at that time was taken as a discharge capacity for 10 C. Similarly, discharge capacities for 30 C, 100 C, and 300 C were individually determined, and, taking the discharge capacity for 1 C as 100%, a capacity maintaining ratio was determined by making a calculation.

(Cycle Life)

A charge/discharge test in which charging was conducted at 1 C until the voltage became 2 V and then discharging was conducted at 1 C until the voltage became 0 V was performed. In this instance, a percentage of the discharge capacity to that in the first discharge was calculated, and the number of charge/discharge cycles at which the capacity was reduced to less than 80% was determined as a life.

(Float Test)

Charging was conducted at 1 C at 60° C. until the voltage became 2.8 V, and a change of the impedance at a constant voltage of 2.8 V was measured substantially on alternate days. A period of time until the resistance was increased two times was determined as a life.

(Peeling Test of the Electrode after Durability Test)

A battery was subjected to 3,000-hour float durability test under conditions for the above-mentioned float life, and, after the durability test, the resultant electrical double layer capacitor was disassembled to check whether or not the active material layer was removed from the electrode current collector.

Evaluations were made in accordance with the following criteria.

⊚: No removal is observed.
○: A partial removal is observed, but the current collector is not exposed.
Δ: A removal proceeds, and part of the current collector is exposed.
X: The active material layer is completely removed.

TABLE 1

| | | | | Vinylsilane copolymer | | | | |
|---|---|---|---|---|---|---|---|---|
| | | Monomer | | Saporification degree % | m/n | m | n | $R^1$ |
| Example | 1 | Vinyl acetate | VTES | 99 | 0.01 | 10 | 990 | H, Na, $CH_3CO$ |
| | 2 | | | | | | | |
| | 3 | | | | | | | |
| | 4 | | | | 0.026 | 25 | 975 | |
| | 5 | | | 75 | 0.01 | 10 | 990 | |
| | 6 | | | 99 | | | | |
| | 7 | | | 96 | 0.01 | 10 | 990 | H, Na, Li, $CH_3CO$, |
| | 8 | γAPTIVES | | 90 | 0.01 | 10 | 990 | H, Na, $CH_3CO$ |
| | 9 | VTES | Limonene oxide (LO) | 99 | 0.01 | 11 | 1100 | H, Na, $CH_3CO$ |
| | 10 | | Na2-acrylamido-2-methylpropanesulfonate | 99 | 0.01 | 15 | 1500 | $CCNHC(CH_3)_2$ $CH_2SO_3Na$, H, $CH_3CO$ |
| | 11 | | | 99 | 0.01 | 10 | 990 | H, Na, |
| | 12 | | | 99 | 0.01 | 10 | 990 | $CH_3CO$ |
| Comparative Example | 1 | Battery current collector is not coated with the concductive composition for coating a battery current collector. | | | | | | |
| | 2 | Conductive composition for coating a battery current collector using partially saponified polyvinyl alcohol is used. | | | | | | |
| | 3 | Conductive composition for coating a battery current collector using partially saponified polyvinyl alcohol is used. | | | | | | |
| | 4 | Conductive composition for coating a battery current collector using partially saponified polyvinyl alcohol is used. | | | | | | |
| | 5 | Polycarboxylic acid is omitted from the conductive composition for coating a battery current collector in Example 1. | | | | | | |
| | 6 | Battery current collector has a surface treated with a silane coupling agent. | | | | | | |

TABLE 1-continued

7 Battery current collector is not coated with the conductive composition for coating a battery current collector.
8 Electrical double layer capacitor current collector is not coated with the conductive composition for coating a battery current collector.
9 Etched foil is used as electrical double layer capacitor current collector.

| | | Vinylsilane copolymer | | Polycarboxylic acid/ Conductive auxiliary | Battery current collector | Battery characteristics | | | |
|---|---|---|---|---|---|---|---|---|---|
| | | $R^5$ | X | | | Initial capacity mAh | Initial internal resistance Ω | Elastic modulus Gpa | Volume shrinkage % |
| Example | 1 | $C_2H_5$, Na | Single bond | Pyromellitic acid/Acetylene black | Battery current collector | 10 | 3 | 0.9 | 6.1 |
| | 2 | | | | | 10 | 3.1 | 0.9 | 6.1 |
| | 3 | | | | | 8 | 4.3 | 0.9 | 6.1 |
| | 4 | | | | | 10 | 3 | 1 | 5.8 |
| | 5 | | | | | 10 | 3 | 0.7 | 5.5 |
| | 6 | | | | | 11 | 3.5 | 0.9 | 6.1 |
| | 7 | $C_2H_5$, Li | | | | 12 | 3 | 1 | 5.6 |
| | 8 | $CH_3$, Na | $COOC_3H_6$ | | | 12 | 3.3 | 0.8 | 5.6 |
| | 9 | | Single bond | | | 12 | 2.8 | 1.3 | 5 |
| | 10 | | | | | 11 | 2.9 | 0.8 | 6.3 |
| | 11 | | | | Electrical double layer capacitor current collector | 1.5 | 1.8 | 0.9 | 6.1 |
| | 12 | $C_2H_5$, Na, TEAM | | | | 1.7 | 1.6 | 0.9 | 6.1 |
| Comparative Example | 1 | Battery current collector is not coated with the conductive composition for coating a battery current collector. | | | | 7 | 4.5 | — | — |
| | 2 | Conductive composition for coating a battery current collector using partially saponified polyvinyl alcohol is used. | | | | 9 | 4.1 | — | — |
| | 3 | Conductive composition for coating a battery current collector using partially saponified polyvinyl alcohol is used. | | | | 9 | 3.8 | 0.4 | 4.8 |
| | 4 | Conductive composition for coating a battery current collector using partially saponified polyvinyl alcohol is used. | | | | 9 | 3.7 | 0.5 | 5 |
| | 5 | Polycarboxylic acid is omitted from the conductive composition for coating a battery current collector in Example 1. | | | | 8 | 4.1 | — | — |
| | 6 | Battery current collector has a surface treated with a silane coupling agent. | | | | 7 | 6.3 | — | — |
| | 7 | Battery current collector is not coated with the conductive composition for coating a battery current collector. | | | | 3 | 40 | — | — |
| | 8 | Electrical double layer capacitor current collector is not coated with the conductive composition for coating a battery current collector. | | | | 1.2 | 4.8 | — | — |
| | 9 | Etched foil is used as electrical double layer capacitor current collector. | | | | 1.4 | 2.2 | — | — |

| | | | | Battery characteristics | | | | | | | |
|---|---|---|---|---|---|---|---|---|---|---|---|
| | Vinylsilane copolymer | | K Value | Rate characteristics Capacity maintaining ratio (%) | | | | | | Cycle life | Float life | Peel |
| | copolymer | | Gpa | 1 C | 3 C | 10 C | 30 C | 100 C | 300 C | Cycles | Hours | resistance |
| Example | 1 | | 5.5 | 99 | 91 | 62 | 32 | — | — | 530 | 800 | ◉ |
| | 2 | | 5.5 | 99 | 90 | 60 | 29 | — | — | 520 | 790 | ◉ |
| | 3 | | 5.5 | 97 | 76 | 49 | 2 | — | — | 310 | 420 | ○ |
| | 4 | | 5.8 | 99 | 92 | 63 | 34 | — | — | 720 | 1300 | ◉ |
| | 5 | | 3.9 | 99 | 90 | 59 | 30 | — | — | 490 | 710 | ○ |
| | 6 | | 5.5 | 99 | 87 | 57 | 21 | — | — | 500 | 700 | ○ |
| | 7 | | 5.6 | 99 | 93 | 65 | 37 | — | — | 540 | 850 | ◉ |
| | 8 | | 4.5 | 99 | 93 | 62 | 34 | — | — | 470 | 720 | ○ |
| | 9 | | 6.5 | 99 | 93 | 68 | 39 | — | — | 590 | 950 | ◉ |
| | 10 | | 5 | 99 | 93 | 66 | 37 | — | — | 490 | 850 | ◉ |
| | 11 | | 5.5 | — | — | 99 | 97 | 92 | 89 | 3800 | 1100 | ◉ |
| | 12 | | 5.5 | — | — | 99 | 96 | 95 | 91 | 4500 | 1200 | ◉ |
| Comparative Example | 1 | | — | 95 | 74 | 45 | 0 | — | — | 81 | 45 | X |
| | 2 | | — | 97 | 79 | 50 | 12 | — | — | 110 | 81 | X |
| | 3 | | 1.9 | 97 | 81 | 52 | 18 | — | — | 160 | 110 | Δ |
| | 4 | | 2.5 | 97 | 83 | 55 | 22 | — | — | 180 | 120 | Δ |
| | 5 | | — | 98 | 81 | 54 | 20 | — | — | 130 | 100 | Δ |

TABLE 1-continued

| | | | | | | | | | | |
|---|---|---|---|---|---|---|---|---|---|---|
| 6 | — | 89 | 15 | 2 | 0 | — | — | 91 | 63 | Δ |
| 7 | — | 45 | 8 | 0 | 0 | — | — | 26 | 39 | X |
| 8 | — | — | — | 98 | 96 | 90 | 86 | 1910 | 49 | X |
| 9 | — | — | — | 99 | 97 | 91 | 88 | 2800 | 520 | Δ |

In Table 1 above, VTES indicates vinyltriethoxysilane, and γAPTMES indicates γ-acryloxypropyltrimethoxysilane.

INDUSTRIAL APPLICABILITY

The conductive composition of the present invention for coating a current collector for a battery or an electrical double layer capacitor exhibits a low internal resistance and more excellent electrochemical durability than that of a conventional composition, and therefore can provide a battery having excellent long-term reliability.

DESCRIPTION OF THE REFERENCE NUMERALS

1: Active material layer
2: Coating layer of the conductive composition for coating a current collector for a battery or an electrical double layer capacitor
3: Battery current collector

The invention claimed is:

1. A conductive composition for coating a current collector for a battery or an electrical double layer capacitor, the conductive composition comprising a vinylsilane copolymer, a polycarboxylic acid (excluding the vinylsilane copolymer), and a conductive auxiliary, the vinylsilane copolymer being represented by the following formula (1):

(1)

wherein U represents a unit represented by the following formula (2):

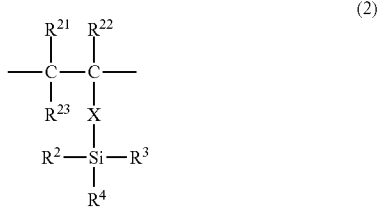

(2)

wherein X represents a single bond or a bonding chain (excluding oxygen),
each of $R^2$ to $R^4$ independently represents a group selected from the group consisting of:
—$OR^5$ (wherein $R^5$ represents a group selected from the group consisting of H, a $C_1$-$C_6$ alkyl group, and a group derived from a cation capable of constituting an electrolyte for a battery or electrical double layer capacitor);
a $C_1$-$C_6$ alkyl group; and
a halogen group, and
each of $R^{21}$ to $R^{23}$ independently represents H or a $C_1$-$C_6$ alkyl group, V represents a unit derived from a vinyl monomer having at least an active hydrogen group (excluding the U),
m represents a number of from 1 to 10,000, and
n represents a number of from 20 to 100,000,
wherein the ratio of m to n (min) is 0.0001 to 1.

2. The conductive composition for coating a current collector for a battery or an electrical double layer capacitor according to claim 1, wherein X is a single bond or a group selected from the group consisting of an alkylene, alkenylene, or alkynylene having 6 carbon atoms or less, a phenylene, a naphthylene, a structure of the above group having hydrogen(s) replaced by fluorine(s), —$CH_2OCH_2$—, —$(OCH_2)m$, —$(CH_2O)_mCH_2$—, —CO—, —COCO—, —$CO(CH_2)_mCO$—, —$CO(C_6H_4)CO$—, —S—, —CS—, —SO—, —SO2—, —NR—, —CONR—, —NRCO—, CSNR—, —NRCS—, —NRNR—, and —$HPO_4$—(wherein R each occurrence independently represents a hydrogen atom or an alkylene group having 6 carbon atoms or less, and m is a natural number).

3. The conductive composition for coating a current collector for a battery or an electrical double layer capacitor according to claim 1, wherein the active hydrogen group is a group selected from the group consisting of a hydroxyl group (—OH), a carboxyl group (—COOH), an amino group (—$NH_2$, —$NHR^6$), a hydrazide group ($R^7R^8NN(R^9)C(=O)R^{10}$), a hydroxyamino group (—NHOH), a sulfonic group (—$SO_3H$), and a thiol group (—SH)(wherein, in the above formulae, each of $R^6$ to $R^{10}$ independently represents a hydrogen atom, a $C_1$-$C_8$ alkyl group, a hydroxyl group, an acyl group, a carboxyl group, an amino group, a vinyl group, an allyl group, an aryl group, a halogen, or a metal).

4. The conductive composition for coating a current collector for a battery or an electrical double layer capacitor according to claim 1, wherein the vinyl monomer is a vinyl carboxylate monomer.

5. The conductive composition for coating a current collector for a battery or an electrical double layer capacitor according to claim 1, wherein the group derived from a cation capable of constituting an electrolyte for a battery or electrical double layer capacitor is a group derived from at least one compound selected from the group consisting of an alkali metal, an alkaline earth metal, lithium, and a tetraalkylammonium.

6. A conductive composition for coating a current collector for a battery or an electrical double layer capacitor, the conductive composition comprising a vinyl carboxylate copolymer, a polycarboxylic acid (excluding the vinyl carboxylate copolymer), and a conductive auxiliary,
the vinyl carboxylate copolymer being a copolymer comprising a vinyl carboxylate monomer and a vinylsilane monomer,
wherein the vinylsilane monomer is at least one compound selected from the group consisting of a vinylalkyldialkoxysilane, a γ-(meth)acryloxypropyltrialkoxysilane, a γ-(meth)acryloxypropylalkyldialkoxysilane, and vinyltris(β-methoxyethoxy)silane.

7. The conductive composition for coating a current collector for a battery or an electrical double layer capacitor according to claim 1, wherein the polycarboxylic acid has a molecular weight of 1,000 or less.

8. The conductive composition for coating a current collector for a battery or an electrical double layer capacitor according to claim 1, wherein the polycarboxylic acid is at least one compound selected from the group consisting of citric acid, butanetetracarboxylic acid, 3,3',4,4'-biphenyltetracarboxylic acid, hexahydrophthalic acid, 3,3',4,4'-diphenyl sulfone tetracarboxylic acid, methylbicyclo [2.2.1] heptane-2,3-dicarboxylic acid, bicyclo [2 .2.1]heptane-2,3-dicarboxylic acid, aspartic acid, pyromellitic acid, mellitic acid, a phosphate group-containing tetracarboxylic acid, phenylethynylphthalic acid, and oxydiphthalic acid, and/or an acid anhydride derived from the above compound, and/or at least one compound selected from the group consisting of ethylene glycol bisanhydrotrimellitate, 1,3,3$a$,4,5,9b -hexahydro-5 (tetrahydro -2,5-dioxo-3-furanyl)naphtho [1,2-c] furan-1,3-dione, glycerol bisanhydrotrimellitate monoacetate, and ethylene glycol bisanhydrotrimellitate.

9. The conductive composition for coating a current collector for a battery or an electrical double layer capacitor according to claim 1, further comprising at least one coupling agent selected from the group consisting of a titanium coupling agent and a silane coupling agent.

10. The conductive composition for coating a current collector for a battery or an electrical double layer capacitor according to claim 1, which has a K value of 3 to 90, as defined by the following formula (3):

$$K=S_v \times GPa \tag{3}$$

wherein $S_v$ and GPa are a volume shrinkage and an elastic modulus, respectively, of the conductive composition for coating a current collector for a battery or an electrical double layer capacitor.

11. A battery current collector which is coated with the conductive composition for coating a current collector for a battery or an electrical double layer capacitor according to claim 1.

12. A battery or electrical double layer capacitor comprising the current collector for a battery or an electrical double layer capacitor according to claim 11.

13. The conductive composition for coating a current collector for a battery or an electrical double layer capacitor according to claim 6, wherein the polycarboxylic acid has a molecular weight of 1,000 or less.

14. The conductive composition for coating a current collector for a battery or an electrical double layer capacitor according to claim 6, wherein the polycarboxylic acid is at least one compound selected from the group consisting of citric acid, butanetetracarboxylic acid, 3,3',4,4'-biphenyltetracarboxylic acid, hexahydrophthalic acid, 3,3',4,4'-diphenyl sulfone tetracarboxylic acid, methylbicyclo[2.2.1]heptane-2, 3-dicarboxylic acid, bicyclo[2.2.1]heptane-2,3-dicarboxylic acid, aspartic acid, pyromellitic acid, mellitic acid, a phosphate group -containing tetracarboxylic acid, phenylethynylphthalic acid, and oxydiphthalic acid, and/or an acid anhydride derived from the above compound, and/or at least one compound selected from the group consisting of ethylene glycol bisanhydrotrimellitate, 1,3,3$a$,4,5,9b -hexahydro-5 (tetrahydro-2,5-dioxo -3-furanyl)naphtho[1,2-c]furan-1,3-dione, glycerol bisanhydrotrimellitate monoacetate, and ethylene glycol bisanhydrotrimellitate.

15. The conductive composition for coating a current collector for a battery or an electrical double layer capacitor according to claim 6, further comprising at least one coupling agent selected from the group consisting of a titanium coupling agent and a silane coupling agent.

16. The conductive composition for coating a current collector for a battery or an electrical double layer capacitor according to claim 6, which has a K value of 3 to 90, as defined by the following formula (3):

$$K=S_v \times GPa \tag{3}$$

wherein $S_v$ and GPa are a volume shrinkage and an elastic modulus, respectively, of the conductive composition for coating a current collector for a battery or an electrical double layer capacitor.

17. A battery current collector which is coated with the conductive composition for coating a current collector for a battery or an electrical double layer capacitor according to claim 6.

18. A battery or electrical double layer capacitor comprising the current collector for a battery or an electrical double layer capacitor according to claim 17.

19. The conductive composition for coating a current collector for a battery or an electrical double layer capacitor according to claim 1, wherein m in formula 2 represents a number from 5 to 1000.

* * * * *